US008297388B2

(12) United States Patent
Lindenkamp et al.

(10) Patent No.: US 8,297,388 B2
(45) Date of Patent: Oct. 30, 2012

(54) WHEELCHAIR WITH SUSPENSION ARMS

(75) Inventors: Horst Lindenkamp, Bad Oeynhausen (DE); Jens Farwer, Bad Oeynhausen (DE)

(73) Assignee: Invacare International SARL (CH)

( * ) Notice: Subject to any disclaimer, the term of this patent is extended or adjusted under 35 U.S.C. 154(b) by 57 days.

(21) Appl. No.: 12/522,837

(22) PCT Filed: Jan. 14, 2008

(86) PCT No.: PCT/IB2008/050111
§ 371 (c)(1),
(2), (4) Date: Nov. 13, 2009

(87) PCT Pub. No.: WO2008/084462
PCT Pub. Date: Jul. 17, 2008

(65) Prior Publication Data

US 2010/0102529 A1 Apr. 29, 2010

(30) Foreign Application Priority Data

Jan. 12, 2007 (EP) .................................... 07100483

(51) Int. Cl.
*B60K 1/00* (2006.01)

(52) U.S. Cl. .................... 180/65.1; 180/907; 280/250.1; 280/304.1

(58) Field of Classification Search ............... 280/250.1, 280/304.1; 180/65.1, 907
See application file for complete search history.

(56) References Cited

U.S. PATENT DOCUMENTS 1,973,627 A 9/1934 Harter
2,398,211 A 4/1946 du Pont
2,427,482 A 9/1947 Wiessman
2,767,995 A 10/1956 Stout
2,949,153 A 8/1960 Hickman
2,986,200 A 5/1961 Nobile
3,104,112 A 9/1963 Crail
3,174,176 A 3/1965 Olson
3,191,990 A 6/1965 Rugg et al.
3,195,670 A 7/1965 Dunn
3,210,092 A 10/1965 Kraus et al.

(Continued)

FOREIGN PATENT DOCUMENTS

CA 2254372 A1 5/2000

(Continued)

OTHER PUBLICATIONS

"Big Bounder Power Wheelchair: Conventional "Tubular" Style Frame"; http://www.wheelchair.com/bigbounderpage.htm, Accessed on the World Wide Web on Dec. 17, 2003, p. 1-4.

(Continued)

*Primary Examiner* — J. Allen Shriver, II
*Assistant Examiner* — Erez Gurari
(74) *Attorney, Agent, or Firm* — Calfee, Halter & Griswold, LLP

(57) ABSTRACT

Each wheel (10, 14/20, 24) of the wheelchair (1) is fixed to a suspension arm (11,15/21, 25). A force transmitting device, for example a spring and damper of the wheelchair unit, directly connects two suspension arms situated on the same side of the wheeled conveyance, so that forces exerted on one of the wheels are transmitted to the other wheel. In this way, obstacles can more conveniently be overcome. A further advantage of the wheelchair is that it can be easily upscaled and driving properties can be adjusted according to a user's preferences.

22 Claims, 11 Drawing Sheets

U.S. PATENT DOCUMENTS

| | | | |
|---|---|---|---|
| 3,282,605 | A | 11/1966 | Nihlean et al. |
| 3,314,672 | A | 4/1967 | Persson |
| 3,573,877 | A | 4/1971 | Locke |
| 3,580,591 | A | 5/1971 | Coffey |
| 3,589,700 | A | 6/1971 | Ruet et al. |
| 3,592,282 | A | 7/1971 | Soileau |
| 3,602,522 | A | 8/1971 | Zamotin |
| 3,661,228 | A | 5/1972 | Glasser |
| 3,664,450 | A | 5/1972 | Udden et al. |
| 3,682,462 | A | 8/1972 | Papousek |
| 3,689,103 | A | 9/1972 | Meulendyk |
| 3,709,313 | A | 1/1973 | James |
| 3,848,883 | A | 11/1974 | Breacain |
| 3,862,751 | A | 1/1975 | Schwaller |
| 3,876,012 | A | 4/1975 | Regier |
| 3,881,773 | A | 5/1975 | Rodaway |
| 3,883,153 | A | 5/1975 | Singh et al. |
| 3,893,529 | A | 7/1975 | Karchak, Jr. et al. |
| 3,901,337 | A | 8/1975 | Cragg |
| 3,901,527 | A | 8/1975 | Danziger et al. |
| 3,905,437 | A | 9/1975 | Kaiho et al. |
| 3,917,312 | A | 11/1975 | Rodaway |
| 3,930,551 | A | 1/1976 | Cragg |
| 3,952,822 | A | 4/1976 | Udden et al. |
| 3,953,054 | A | 4/1976 | Udden et al. |
| 3,976,152 | A | 8/1976 | Bell |
| 4,078,817 | A | 3/1978 | Ferguson et al. |
| 4,108,449 | A | 8/1978 | Rhodes |
| 4,118,020 | A | 10/1978 | Myers |
| 4,119,163 | A | 10/1978 | Ball |
| 4,128,137 | A | 12/1978 | Booth |
| 4,190,263 | A | 2/1980 | Powers |
| 4,222,449 | A | 9/1980 | Feliz |
| 4,245,847 | A | 1/1981 | Knott |
| 4,264,085 | A | 4/1981 | Volin |
| 4,310,167 | A | 1/1982 | McLaurin |
| 4,333,681 | A | 6/1982 | Nelson |
| 4,337,958 | A | 7/1982 | Witt et al. |
| 4,341,278 | A | 7/1982 | Meyer |
| 4,375,295 | A | 3/1983 | Volin |
| 4,387,325 | A | 6/1983 | Klimo |
| 4,405,142 | A | 9/1983 | Whetstine |
| 4,436,320 | A | 3/1984 | Brudermann et al. |
| 4,437,678 | A | 3/1984 | Schultz |
| 4,455,029 | A | 6/1984 | Taylor |
| 4,455,031 | A | 6/1984 | Hosaka |
| 4,456,295 | A | 6/1984 | Francu |
| 4,483,407 | A | 11/1984 | Iwamoto et al. |
| 4,500,102 | A | 2/1985 | Havry et al. |
| 4,513,832 | A | 4/1985 | Engman |
| 4,515,385 | A | 5/1985 | Christian |
| 4,542,918 | A | 9/1985 | Singleton |
| 4,545,593 | A | 10/1985 | Farnam |
| 4,545,616 | A | 10/1985 | Booth |
| 4,556,229 | A | 12/1985 | Bihler et al. |
| 4,565,385 | A | 1/1986 | Morford |
| RE32,242 | E | 9/1986 | Minnebraker |
| 4,618,155 | A | 10/1986 | Jayne |
| 4,641,848 | A | 2/1987 | Ayers |
| 4,655,471 | A | 4/1987 | Peek |
| 4,687,068 | A | 8/1987 | Pagett |
| 4,720,223 | A | 1/1988 | Neights et al. |
| 4,721,321 | A | 1/1988 | Haury et al. |
| 4,721,322 | A | 1/1988 | Hawkins |
| 4,730,842 | A | 3/1988 | Summers et al. |
| 4,736,983 | A | 4/1988 | Furbee |
| 4,759,418 | A | 7/1988 | Goldenfeld et al. |
| 4,763,910 | A | 8/1988 | Brandli et al. |
| 4,805,712 | A | 2/1989 | Singleton |
| 4,805,925 | A | 2/1989 | Haury et al. |
| 4,811,966 | A | 3/1989 | Singleton |
| 4,823,900 | A | 4/1989 | Farnam |
| 4,826,194 | A | 5/1989 | Sakita |
| 4,840,394 | A | 6/1989 | Bickler |
| 4,861,056 | A | 8/1989 | Duffy, Jr. et al. |
| 4,862,983 | A | 9/1989 | Kreft |
| 4,886,294 | A | 12/1989 | Nahachewski |
| 4,905,972 | A | 3/1990 | Scowen |
| 4,919,441 | A | 4/1990 | Marier et al. |
| 4,926,952 | A | 5/1990 | Farnam |
| 4,934,626 | A | 6/1990 | Kimura |
| 4,962,942 | A | 10/1990 | Barnett et al. |
| 4,967,864 | A | 11/1990 | Boyer et al. |
| 4,989,890 | A | 2/1991 | Lockard et al. |
| 5,020,816 | A | 6/1991 | Mulholland |
| 5,044,647 | A | 9/1991 | Patterson |
| 5,044,648 | A | 9/1991 | Knapp |
| 5,076,390 | A | 12/1991 | Haskins |
| 5,076,602 | A | 12/1991 | Robertson et al. |
| 5,113,959 | A | 5/1992 | Mastov et al. |
| 5,123,495 | A | 6/1992 | Littlejohn et al. |
| 5,125,468 | A | 6/1992 | Coker |
| 5,137,295 | A | 8/1992 | Peek |
| 5,156,226 | A | 10/1992 | Boyer et al. |
| 5,176,393 | A | 1/1993 | Robertson et al. |
| 5,180,025 | A | 1/1993 | Yeh et al. |
| 5,180,275 | A | 1/1993 | Czech et al. |
| 5,181,133 | A | 1/1993 | Lipton |
| 5,181,733 | A | 1/1993 | Tague |
| 5,183,133 | A | 2/1993 | Roy et al. |
| 5,197,559 | A | 3/1993 | Garin, III et al. |
| 5,203,610 | A | 4/1993 | Miller |
| 5,209,509 | A | 5/1993 | Gay et al. |
| 5,222,567 | A | 6/1993 | Broadhead et al. |
| 5,228,709 | A | 7/1993 | Kao |
| 5,230,522 | A | 7/1993 | Gehlsen et al. |
| 5,241,876 | A | 9/1993 | Mathis |
| 5,248,007 | A | 9/1993 | Watkins et al. |
| 5,290,055 | A | 3/1994 | Treat, Jr. |
| 5,294,141 | A | 3/1994 | Mentessi et al. |
| 5,297,021 | A | 3/1994 | Koerlin et al. |
| 5,301,964 | A | 4/1994 | Papac |
| 5,316,328 | A | 5/1994 | Bussinger |
| 5,341,533 | A | 8/1994 | Seitz |
| 5,351,774 | A | 10/1994 | Okamoto |
| 5,366,037 | A | 11/1994 | Richey |
| 5,372,211 | A | 12/1994 | Wilcox et al. |
| 5,403,031 | A | 4/1995 | Gottschalk et al. |
| 5,419,571 | A | 5/1995 | Vaughan |
| 5,435,404 | A | 7/1995 | Gorin, III |
| 5,447,317 | A | 9/1995 | Gehlsen et al. |
| 5,464,271 | A | 11/1995 | McFarland |
| 5,467,838 | A | 11/1995 | Wu |
| 5,482,261 | A | 1/1996 | Ortega |
| 5,485,140 | A | 1/1996 | Bussin |
| 5,489,139 | A | 2/1996 | McFarland |
| 5,513,875 | A | 5/1996 | Tahara et al. |
| 5,518,081 | A | 5/1996 | Thibodeau |
| 5,531,284 | A | 7/1996 | Okamoto |
| 5,540,297 | A | 7/1996 | Meier |
| 5,562,172 | A | 10/1996 | Mick |
| 5,564,512 | A | 10/1996 | Scheulderman |
| 5,575,348 | A | 11/1996 | Goertzen et al. |
| 5,611,555 | A | 3/1997 | Vidal |
| 5,628,377 | A | 5/1997 | LaGloan |
| 5,701,122 | A | 12/1997 | Canedy |
| 5,727,802 | A | 3/1998 | Garven, Jr. et al. |
| 5,727,809 | A | 3/1998 | Ordelman et al. |
| 5,762,155 | A | 6/1998 | Scheulderman |
| 5,772,048 | A | 6/1998 | Sopcisak |
| 5,772,226 | A | 6/1998 | Bobichon |
| 5,772,237 | A | 6/1998 | Finch et al. |
| D397,645 | S | 9/1998 | Schaffner |
| 5,833,248 | A | 11/1998 | Eguchi |
| 5,848,658 | A | 12/1998 | Pulver |
| 5,851,018 | A | 12/1998 | Curran et al. |
| 5,851,019 | A | 12/1998 | Gill et al. |
| 5,853,059 | A | 12/1998 | Goertzen et al. |
| D404,693 | S | 1/1999 | Schaffner et al. |
| 5,855,387 | A | 1/1999 | Gill et al. |
| 5,899,475 | A | 5/1999 | Verhaeg et al. |
| 5,904,214 | A | 5/1999 | Lin |
| 5,921,532 | A | 7/1999 | Pierce et al. |
| 5,944,131 | A | 8/1999 | Schaffner et al. |
| 5,954,351 | A | 9/1999 | Koschinat |
| 5,957,474 | A | 9/1999 | Mundy et al. |
| 5,964,473 | A | 10/1999 | Degonda et al. |

| | | | |
|---|---|---|---|
| 6,003,624 | A | 12/1999 | Jorgensen et al. |
| 6,041,876 | A | 3/2000 | Pulver et al. |
| 6,047,979 | A | 4/2000 | Kraft et al. |
| 6,062,600 | A | 5/2000 | Kamen et al. |
| 6,070,898 | A | 6/2000 | Dickie et al. |
| 6,073,951 | A | 6/2000 | Jindra et al. |
| 6,079,698 | A | 6/2000 | Patterson et al. |
| 6,079,725 | A | 6/2000 | Lazaros |
| D429,665 | S | 8/2000 | Dickie |
| 6,129,165 | A | 10/2000 | Schaffner et al. |
| 6,131,679 | A | 10/2000 | Pulver et al. |
| 6,161,856 | A | 12/2000 | Peterson |
| 6,168,178 | B1 | 1/2001 | Garven, Jr. et al. |
| 6,176,335 | B1 * | 1/2001 | Schaffner et al. ............ 180/65.1 |
| 6,179,076 | B1 | 1/2001 | Fernie et al. |
| 6,186,252 | B1 | 2/2001 | Schaffner et al. |
| 6,196,343 | B1 | 3/2001 | Strautnieks |
| 6,196,343 | C1 | 3/2001 | Strautnieks |
| 6,199,647 | B1 | 3/2001 | Schaffner et al. |
| 6,206,119 | B1 | 3/2001 | Wu |
| 6,209,670 | B1 | 4/2001 | Fernie et al. |
| 6,225,894 | B1 | 5/2001 | Kyrtsos |
| 6,234,263 | B1 | 5/2001 | Boivin et al. |
| 6,234,507 | B1 | 5/2001 | Dickie et al. |
| 6,241,275 | B1 | 6/2001 | Slagerman |
| 6,264,218 | B1 | 7/2001 | Slagerman |
| 6,279,927 | B1 | 8/2001 | Nishihira et al. |
| 6,312,000 | B1 | 11/2001 | Pauls et al. |
| 6,322,089 | B1 | 11/2001 | Dantele et al. |
| 6,341,657 | B1 | 1/2002 | Hopely et al. |
| 6,341,671 | B1 | 1/2002 | Ebersole |
| 6,347,688 | B1 | 2/2002 | Hall et al. |
| 6,357,793 | B1 | 3/2002 | Dickie et al. |
| 6,375,209 | B1 | 4/2002 | Schlangen |
| 6,394,738 | B1 | 5/2002 | Springer |
| 6,405,816 | B1 | 6/2002 | Kamen et al. |
| 6,425,597 | B1 | 7/2002 | Peterson |
| 6,428,020 | B1 | 8/2002 | Steadman |
| 6,429,541 | B2 | 8/2002 | Takenaka et al. |
| 6,454,286 | B1 | 9/2002 | Hosino |
| 6,460,641 | B1 | 10/2002 | Kral |
| 6,460,869 | B1 | 10/2002 | Tremouilles |
| 6,494,474 | B1 | 12/2002 | Kremer, Jr. |
| 6,533,305 | B1 | 3/2003 | Falk |
| 6,533,306 | B2 | 3/2003 | Watkins |
| 6,543,564 | B1 | 4/2003 | Kamen et al. |
| 6,543,798 | B2 | 4/2003 | Schaffner et al. |
| 6,544,086 | B2 | 4/2003 | Goertzen et al. |
| 6,554,086 | B1 * | 4/2003 | Goertzen et al. ............ 180/65.1 |
| 6,568,030 | B1 | 5/2003 | Watanabe et al. |
| 6,581,711 | B1 | 6/2003 | Tuluie |
| 6,588,799 | B1 | 7/2003 | Sanchez |
| 6,640,916 | B2 | 11/2003 | Schaffner et al. |
| 6,688,437 | B2 | 2/2004 | Usherovich |
| 6,712,369 | B2 | 3/2004 | Wu |
| 6,715,845 | B2 | 4/2004 | Kamen et al. |
| 6,851,711 | B2 | 2/2005 | Goertzen et al. |
| 6,857,490 | B2 | 2/2005 | Quigg |
| 6,923,278 | B2 | 8/2005 | Mulhern et al. |
| 6,923,280 | B2 | 8/2005 | Goertzen et al. |
| 6,935,448 | B2 | 8/2005 | Goertzen et al. |
| 7,021,641 | B2 | 4/2006 | Wu |
| 7,040,429 | B2 | 5/2006 | Molnar et al. |
| 7,055,634 | B2 | 6/2006 | Molnar |
| 7,066,290 | B2 | 6/2006 | Fought |
| 7,083,195 | B2 | 8/2006 | Goertzen et al. |
| 7,100,716 | B2 | 9/2006 | Engels et al. |
| 7,175,193 | B2 | 2/2007 | Wu |
| 7,219,755 | B2 | 5/2007 | Goertzen et al. |
| 7,219,924 | B2 | 5/2007 | Mulhern et al. |
| 7,234,554 | B2 | 6/2007 | Mulhern et al. |
| 7,264,272 | B2 * | 9/2007 | Mulhern et al. ............. 280/755 |
| 7,273,118 | B2 | 9/2007 | Huang |
| 7,293,801 | B2 | 11/2007 | Bertrand et al. |
| 7,370,876 | B2 | 5/2008 | Hsu et al. |
| 7,374,002 | B2 | 5/2008 | Fought |
| 7,380,824 | B2 | 6/2008 | Chen et al. |
| 7,389,835 | B2 | 6/2008 | Mulhern et al. |
| 7,413,038 | B2 | 8/2008 | Mulhern et al. |
| 7,472,767 | B2 | 1/2009 | Molnar |
| 7,490,683 | B2 | 2/2009 | Schaffner |
| 7,556,109 | B2 | 7/2009 | Chen et al. |
| 7,597,163 | B2 | 10/2009 | Goertzen et al. |
| 7,766,106 | B2 | 8/2010 | Puskar-Pasewicz et al. |
| 7,828,310 | B2 | 11/2010 | Vreeswijk et al. |
| 7,896,394 | B2 | 3/2011 | Jackson et al. |
| 8,172,015 | B2 | 5/2012 | Molnar |
| 8,172,016 | B2 | 5/2012 | Goertzen et al. |
| 2003/0122332 | A1 | 7/2003 | Engels et al. |
| 2004/0004342 | A1 | 1/2004 | Mulhern et al. |
| 2004/0032119 | A1 | 2/2004 | Tran et al. |
| 2004/0084230 | A1 | 5/2004 | Grymko et al. |
| 2004/0150204 | A1 | 8/2004 | Goertzen et al. |
| 2004/0262859 | A1 | 12/2004 | Turturiello et al. |
| 2005/0077694 | A1 | 4/2005 | Levi et al. |
| 2005/0225040 | A1 | 10/2005 | Goertzen et al. |
| 2005/0225041 | A1 | 10/2005 | Longino |
| 2006/0021806 | A1 | 2/2006 | Goertzen et al. |
| 2006/0076747 | A1 | 4/2006 | Pauls et al. |
| 2006/0076748 | A1 | 4/2006 | Pauls et al. |
| 2006/0082117 | A1 | 4/2006 | Turturiello |
| 2006/0244249 | A1 | 11/2006 | Goertzen et al. |
| 2007/0023209 | A1 | 2/2007 | Wu |
| 2007/0080003 | A1 | 4/2007 | Koerlin et al. |
| 2008/0208394 | A1 | 8/2008 | Fought |
| 2009/0091092 | A1 | 4/2009 | Molnar |
| 2010/0004820 | A1 | 1/2010 | Bekoscke et al. |
| 2010/0013172 | A1 | 1/2010 | Goertzen |
| 2010/0084209 | A1 | 4/2010 | Bekoscke et al. |

FOREIGN PATENT DOCUMENTS

| | | | |
|---|---|---|---|
| DE | 19806500 | A1 | 8/1999 |
| DE | 10136368 | A1 | 2/2003 |
| DE | 10136369 | A1 | 2/2003 |
| EP | 18101 | | 10/1980 |
| EP | 127929 | A1 | 12/1984 |
| EP | 268960 | | 6/1988 |
| EP | 312969 | | 4/1989 |
| EP | 339500 | | 11/1989 |
| EP | 369791 | | 5/1990 |
| EP | 419085 | | 3/1991 |
| EP | 445171 | B1 | 9/1991 |
| EP | 511113 | | 10/1992 |
| EP | 677285 | A1 | 10/1995 |
| EP | 702945 | | 3/1996 |
| EP | 0829247 | | 3/1998 |
| EP | 841052 | | 5/1998 |
| EP | 908165 | A2 | 4/1999 |
| EP | 908166 | A2 | 4/1999 |
| EP | 927551 | | 7/1999 |
| EP | 0927551 | | 7/1999 |
| EP | 988848 | A2 | 3/2000 |
| EP | 1147969 | | 10/2001 |
| EP | 1279391 | A2 | 1/2003 |
| EP | 1279392 | A2 | 1/2003 |
| EP | 1522295 | A2 | 4/2005 |
| EP | 1 582 189 | | 10/2005 |
| EP | 1513479 | B1 | 4/2006 |
| EP | 2226048 | | 9/2010 |
| FR | 2215054 | A5 | 8/1974 |
| FR | 2399822 | | 3/1979 |
| FR | 2455886 | | 1/1981 |
| FR | 2498925 | | 8/1982 |
| FR | 2749502 | | 12/1997 |
| GB | 151915 | | 10/1920 |
| GB | 154369 | | 12/1920 |
| GB | 265885 | | 2/1927 |
| GB | 474349 | | 10/1937 |
| GB | 841175 | | 7/1960 |
| GB | 2040237 | | 8/1980 |
| GB | 2061197 | | 5/1981 |
| GB | 2141980 | | 1/1985 |
| GB | 2224980 | | 5/1990 |
| JP | 03-11978 | | 12/1989 |
| JP | 04-158864 | | 6/1992 |
| JP | 07-328073 | | 12/1995 |
| JP | 08-038552 | | 2/1996 |
| JP | 10-248877 | | 9/1998 |

| | | | |
|---|---|---|---|
| JP | 11059506 | | 3/1999 |
| JP | 2000-102569 | | 4/2000 |
| JP | 2000-288032 | | 10/2000 |
| JP | 2001-070347 | | 3/2001 |
| JP | 2001-104391 | | 4/2001 |
| JP | 2001-212181 | | 8/2001 |
| JP | 2001-258948 | | 9/2001 |
| JP | 2001-327545 | | 11/2001 |
| JP | 2002-143223 | | 5/2002 |
| JP | 2002-165841 | | 6/2002 |
| JP | 2004202264 | | 7/2004 |
| WO | 82/00445 | | 2/1982 |
| WO | 84/04451 | | 11/1984 |
| WO | 9005515 | | 5/1990 |
| WO | 90/06097 | | 6/1990 |
| WO | 92/09463 | | 6/1992 |
| WO | 93/24342 | | 12/1993 |
| WO | 9413241 | | 6/1994 |
| WO | 94/15567 | A1 | 7/1994 |
| WO | 96/15752 | | 5/1996 |
| WO | 9744206 | | 11/1997 |
| WO | 98/46184 | | 10/1998 |
| WO | 99/17700 | | 4/1999 |
| WO | 00/08910 | | 2/2000 |
| WO | 00/09356 | | 2/2000 |
| WO | 00/12040 | | 3/2000 |
| WO | 00/54718 | | 9/2000 |
| WO | 00/66060 | | 11/2000 |
| WO | 02/34190 | | 5/2002 |
| WO | 03/030800 | | 4/2003 |
| WO | 03/034969 | | 5/2003 |
| WO | 03049664 | A2 | 6/2003 |
| WO | 03/101364 | | 12/2003 |
| WO | 03101364 | | 12/2003 |
| WO | 2004016451 | | 2/2004 |
| WO | 2004/037569 | | 5/2004 |
| WO | 200711668 | | 1/2007 |
| WO | 2007079346 | | 7/2007 |
| WO | 2008/084462 | A1 | 7/2008 |
| WO | 2008097879 | | 8/2008 |
| WO | 2008100759 | | 8/2008 |

OTHER PUBLICATIONS

"Bounder Plus Power Wheelchair: Convention "Tubular" Style Frame"; http://www.wheelchairs.com/plus.htm, Accessed on the World Wide Web on Dec. 17, 2003, p. 1-4.

"Frog Legs; Smoot Ride Ahead"; http://www.froglegsinc.com/index.php, Accessed on the World Wide Web on Dec. 17, 2003, p. 105.

"Frog Legs Tires", http://mdtap.org/tt/1999.09/prod.html, Accessed on the World Wide Web on Dec. 17, 2003, p. 1-3.

"Invacare pronto M7I jr. Power Wheelchair Manual"; Accessed on the World Wide Web on Dec. 17, 2003.

"Invacare Storm Series TDX Power Wheelchairs Manual"; Accessed on the World Wide Web on Dec. 17, 2003, p. 1-24.

"Invacare Xterra Series GT Power Wheelchair Manual", Accessed on the World Wide Web on Dec. 17, 2003, p. 1-4.

"Jazzy 1122", Pride Mobile Products Corp., Accessed on the World Wide Web on Dec. 17, 2003, p. 1-2.

"Jazzy 1133", Pride Mobile Products Corp., Accessed on the World Wide Web on Dec. 17, 2003, p. 1-2.

"Jazzy 1170XL", Pride Mobile Products Corp., Accessed on the World Wide Web on Dec. 17, 2003, p. 1-2.

"Bruno Independent Living Aids ISP 9001 Certified"; http://www.bruno.com/power.sub.—chairs.htm, Accessed on the World Wide Web on Dec. 17, 2003, p. 1-5.

"Top End Terminator SS Sports Wheelchair", http://phc-online.com/terminator.sub.—ss.htm, Accessed on the World Wide Web on Dec. 17, 2003, p. 1-5.

"Transactions of the Institute of Measurement and Control", The British Library of Science Technology and Business, vol. 24, Nov. 5, 2002, 15 pgs.

M.J. Lawn, et al., "Modeling of a Stair-Climbing Wheelchair Mechanism with High Single-Step Capability", IEEE Transactions on Neutral Systems and Rehabilitation Engineering, V.

Quickie G-424 User Instruction Manual & Warranty, 930484 Rev. A (27 sheets) (alleged date not later than 2000).

10 photographs (8.5.times.11) of Quickie G-424 Wheelchair obtained Nov. 24, 2004.

"All-Terrain Wheelchair, Designer's Corner", Design News, Feb. 24, 1992, cover page and p. 54.

Sunrise Medical, Inc., Power Products Parts Manual, 930307 Rev. K, Jul. 2004. (Note: various dates are alleged therein based on wheelchair products listed including the Quickie G-424).

International Search Report and Written Opinion from PCT/IB2008/050111 dated Jun. 4, 2008.

Big Bounder Power Wheelchair: Conventional "Tubular" Style Frame; http://www.wheelchair.com/bigbounderpage.htm, accessed on the worldwide web on Dec. 17, 2003, p. 1-4.

Notice of Allowance from U.S. Appl. No. 12/330,554 dated Feb. 13, 2012.

Office action from U.S. Appl. No. 12/523,630 dated Dec. 21, 2011.

RCE with Remarks (Amendments to Specification) from U.S. Appl. No. 12/568,728 dated Jan. 9, 2012.

Notice of Allowance from U.S. Appl. No. 12/568,728 dated Jan. 24, 2012.

Office action from Canadian Application No. 2,676,423 dated Dec. 7, 2011.

Response to Office Action from European Application No. 11152661.2 dated Oct. 17, 2011.

Office Action from European Application No. 11152661.2 dated Jan. 27, 2012.

Notice of Allowance from U.S. Appl. No. 11/472,509 dated Nov. 14, 2011.

Notice of Allowance from U.S. Appl. No. 12/330,554 dated Nov. 15, 2011.

Notice of Allowance from U.S. Appl. No. 12/568,728 dated Oct. 26, 2011.

Examiner-Initiated Interview Summary from U.S. Appl. No. 12/568,728 dated Dec. 8, 2011.

Office action from Canadian Application No. 2,690,500 dated Oct. 3, 2011.

Response from U.S. Appl. No. 12/523,630 dated Mar. 15, 2012.

Response to Office Action from Canadian Application No. 2,495,751 dated Feb. 23, 2012.

Response to Office Action from Canadian Application No. 2,676,423 dated Nov. 7, 2011.

Office action from Canadian Application No. 2,676,724 dated Feb. 2, 2012.

Response to Office Action from Canadian Application No. 2,690,500 dated Apr. 3, 2012.

Response to Office Action from Canadian Application No. 2,700,672 dated Nov. 18, 2011.

Response to Communication from European Application No. 02775917.4 dated Sep. 6, 2011.

Communication from EP Application No. 03779341.1 dated Oct. 5, 2009.

Response to Communication from EP Application No. 08010025.8 dated Feb. 11, 2012.

Communication from EP Application No. 08729225.6 dated Mar. 1, 2010.

Response to Communication from EP Application No. 08729225.6 dated Jun. 21, 2010.

Response to Communication from European Application No. 01983183.3 dated Sep. 19, 2009.

Permobil Chairman HD3 Owner's Manual dated May 2003, 52 pages.

Permobil C400 Power Wheelchair, Owner's Manual, version 6, 2010, Permobil AB, Sweden, 100 pgs.

Permobil C500 Power Wheelchair, Owner's Manual, version 6, 2010, Permobil AB, Sweden, 100 pgs.

Pride Mobility, Jet 3 Ultra Owner's Manual dated Jun. 2007, 43 pages.

Quantum Series Owner's Manual dated Feb. 2009, 43 pages.

International Search Report from PCT/US98/07543 dated Aug. 19, 1998.

International Search Report from PCT/US01/42656 dated Jan. 14, 2003.

International Search Report from PCT/US02/29996 dated Jun. 24, 2003, 2 pgs.

International Preliminary Examination Written Opinion from PCT/US02/29996 dated Jul. 31, 2003.
International Preliminary Examination Report from PCT/US02/29996 dated Dec. 11, 2003.
International Search Report from PCT/US02/29998 dated Dec. 12, 2002.
International Preliminary Examination Written Opinion from PCT/US02/29998 dated May 20, 2003.
International Preliminary Examination Report from PCT/US02/29998 dated Jan. 13, 2004.
International Search Report and Written Opinion from PCT/US03/25736 dated Dec. 28, 2004.
International Search Report from PCT/US03/34124 Dated Dec. 28, 2004.
International Preliminary Examining Authority Written Opinion from PCT/US03/34124 dated Mar. 8, 2006.
International Preliminary Examination Report from PCT/US03/34124 dated Aug. 25, 2006.
International Search Report from and Written Opinion from PCT/US08/52878 dated Jul. 3, 2008.
International Search Report and Written Opinion from PCT/US08/53242 dated Sep. 3, 2008.
International Search Report and Written Opinion from PCT/US10/51888 dated Dec. 6, 2010.
Office action mailed Feb. 2, 2006 from Control No. 90/007,491.
Interview Summary from Control No. 90/007,491 dated Mar. 23, 2006.
Statement as to the substance of an Interview form Control No. 90/007,491 Apr. 3, 2006.
Response from Control No. 90/007,491 dated Apr. 3, 2006.
Office action mailed Jul. 5, 2006 from Control No. 90/007,491.
Response to Office action from Control No. 90/007,491 dated Sep. 11, 2006.
Office action mailed Sep. 21, 2006 from Control No. 90/007,491.
Response from Control No. 90/007,491 dated Nov. 9, 2006.
Notice of Appeal from Control No. 90/007,491 dated Nov. 9, 2006.
Advisory action from Control No. 90/007,491 dated Nov. 22, 2006.
Appeal Brief from Control No. 90/007,491 dated Jan. 16, 2007.
Advisory action from Control No. 90/007,491 dated Apr. 20, 2007.
Amended Appeal Brief from Control No. 90/007,491 dated Jun. 29, 2007.
Examiner's Answer from Control No. 90/007,491 dated Sep. 24, 2007.
Reply Brief from Control No. 90/007,491 dated Nov. 21, 2007.
Notice of Allowance from U.S. Appl. No. 09/712,547 dated Mar. 11, 2002.
Office action from U.S. Appl. No. 09/974,348 dated Feb. 27, 2003.
Response from U.S. Appl. No. 09/974,348 dated Jul. 28, 2003.
Office action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Office action from related U.S. Appl. No. 10/044,826, mailed Apr. 29, 2003.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
Response from U.S. Appl. No. 10/044,826 dated Aug. 16, 2004.
Notice of Allowability from U.S. Appl. No. 10/044,826 dated Jun. 14, 2005.
Notice of Allowance from U.S. Appl. No. 10/044,826 dated Apr. 3, 2006.
U.S. Patent Office action dated Aug. 8, 2003 from U.S. Appl. No. 10/390,133.
Response from U.S. Appl. No. 10/390,133 dated Feb. 11, 2004.
U.S. Patent Office action dated Jun. 16, 2004 from U.S. Appl. No. 10/390,133.
Response from U.S. Appl. No. 10/390,133 dated Dec. 20, 2004.
Supplemental Notice of Allowance dated Mar. 30, 2005 from U.S. Appl. No. 10/390,133.
Notice of Allowance dated Jan. 11, 2005 from U.S. Appl. No. 10/390,133.
U.S. Patent Office action dated Aug. 8, 2003 from U.S. Appl. No. 10/390,386.
Response from U.S. Appl. No. 10/390,386 dated Nov. 11, 2003.
U.S. Patent Office action dated Jan. 28, 2004 from U.S. Appl. No. 10/390,386.
Response from U.S. Appl. No. 10/390,386 dated May 28, 2004.
U.S. Patent Office action dated Oct. 12, 2004 from U.S. Appl. No. 10/390,386.
Response from U.S. Appl. No. 10/390,386 dated Mar. 16, 2005.
Notice of Allowance dated Apr. 7, 2005 from U.S. Appl. No. 10/390,386.
Notice of Allowance from U.S. Appl. No. 10/643,010 dated Sep. 30, 2004.
Office action from U.S. Appl. No. 10/695,045 dated Feb. 22, 2005.
Response from U.S. Appl. No. 10/695,045 dated Jul. 25, 2005.
Office action from U.S. Appl. No. 10/695,045 dated Oct. 20, 2005.
Response from U.S. Appl. No. 10/695,045 dated Jan. 17, 2006.
Notice of Allowance from U.S. Appl. No. 10/695,045 dated Apr. 11, 2006.
Office action from U.S. Appl. No. 10/762,977 dated Jan. 18, 2005.
Response from U.S. Appl. No. 10/762,977 dated May 18, 2005.
Office action from U.S. Appl. No. 10/762,977 dated Aug. 11, 2005.
Response from U.S. Appl. No. 10/762,977 dated Oct. 3, 2005.
Office action from U.S. Appl. No. 10/762,977 dated Oct. 25, 2005.
Notice of Allowance from U.S. Appl. No. 10/762,977 dated Feb. 23, 2006.
Notice of Allowance from U.S. Appl. No. 11/077,483 dated Aug. 9, 2007.
U.S. Patent Office action dated Sep. 8, 2006 from U.S. Appl. No. 11/145,477.
Response from U.S. Appl. No. 11/145,477 dated Dec. 12, 2006.
Notice of Allowance from U.S. Appl. No. 11/145,477 dated Jan. 8, 2007.
Office action dated Nov. 8, 2006 from U.S. Appl. No. 11/209,001.
Notice of Abandonment from U.S. Appl. No. 11/209,001 dated Jul. 10, 2007.
Supplemental Examiners Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Amendment dated Apr. 9, 2002 submitted during prosecution of U.S. Patent No. 6,554,086, 21 pgs.
Complaint for Patent Infringement Demand for Jury Trial, Case No. 1:06CV0517 dated Mar. 7, 2006.
Request for Reexamination of U.S. Patent No. 6,196,343, filed Apr. 28, 2006, 17 pgs.
Affidavit, executed Apr. 3, 2006 by Mark Sullivan, Invacare Corporation Vice President of Rehab submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Office action from U.S. Appl. No. 08/228,584 dated Apr. 14, 1995.
Response from U.S. Appl. No. 08/228,584 dated Jul. 6, 1995.

Office action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office action from U.S. Appl. No. 08/228,584 dated Mar. 29, 1996.
Response from U.S. Appl. No. 08/228,584 dated Jun. 3, 1996.
Notice of allowance from U.S. Appl. No. 08/228,584 dated Jun. 24, 1996.
Office action from U.S. Appl. No. 08/694,484 dated Dec. 2, 1996.
Response from U.S. Appl. No. 08/694,484 dated Apr. 2, 1997.
Office action from U.S. Appl. No. 08/694,484 dated Jul. 7, 1997.
Office action from U.S. Appl. No. 08/694,484 dated Dec. 3, 1997.
Office action from U.S. Appl. No. 08/694,484 dated Feb. 10, 1998.
Response from U.S. Appl. No. 08/694,484 dated May 4, 1998.
Notice of Allowance from U.S. Appl. No. 08/694,484 dated Jul. 31, 1998.
Office action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office action from U.S. Appl. No. 09/607,468 dated Sep. 26, 2001.
Response from U.S. Appl. No. 09/607,468 dated Dec. 21, 2001.
Office action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.
U.S. Patent Office action dated Nov. 27, 2001 from U.S. Appl. No. 09/698,481.
Response from U.S. Appl. No. 09/698,481 dated Mar. 27, 2002.
U.S. Patent Office action dated Jun. 27, 2002 from U.S. Appl. No. 09/698,481.
Response from U.S. Appl. No. 09/698,481 dated Oct. 29, 2002.
U.S. Patent Office Advisory action dated Nov. 13, 2002 from U.S. Appl. No. 09/698,481.
Supplemental Amendment after Final dated Nov. 27, 2002 from U.S. Appl. No. 09/698,481, 2 pgs.
Notice of Allowance dated Dec. 12, 2002 from U.S. Appl. No. 09/698,481.
Office action from U.S. Appl. No. 09/712,547 dated May 23, 2001.
Response from U.S. Appl. No. 09/712,547 dated Aug. 23, 2001.
Office action from U.S. Appl. No. 09/712,547 dated Oct. 30, 2001.
Response from U.S. Appl. No. 09/712,547 dated Jan. 28, 2002.
Office action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office action from U.S. Appl. No. 11/472,509 dated May 15, 2009.
Response from U.S. Appl. No. 11/472,509 dated Nov. 15, 2009.
Office action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509 filed Mar. 2, 2011.
Interview Summary from U.S. Appl. No. 11/472,509 filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.
Response from U.S. Appl. No. 11/472,509 dated Aug. 8, 2011.
Office action dated Mar. 21, 2007 from U.S. Appl. No. 11/474,834.
Response from U.S. Appl. No. 11/474,834 dated Jun. 28, 2007.
Office action from U.S. Appl. No. 11/474,834 dated Sep. 20, 2007.
Response from U.S. Appl. No. 11/474,834 dated Nov. 20, 2007.
Notice of Allowance from U.S. Appl. No. 11/474,834 dated Jan. 17, 2008.
U.S. Patent Office action dated Jan. 9, 2007 from U.S. Appl. No. 11/490,899.
Response from U.S. Appl. No. 11/490,899 dated Mar. 20, 2007.
Notice of Allowance dated Jun. 6, 2007 from U.S. Appl. No. 11/490,899.
Notice of Allowance from U.S. Appl. No. 11/490,899 dated Feb. 10, 2009.
Notice of Allowance from U.S. Appl. No. 11/490,899 dated May 26, 2009.
Office action from U.S. Appl. No. 12/118,099 dated Oct. 28, 2010.
Response to Office Action from U.S. Appl. No. 12/118,099 dated Apr. 25, 2011.
Notice of Allowance from U.S. Appl. No. 12/118,099 dated Jul. 28, 2011.
Office Action from U.S. Appl. No. 12/330,554 dated Apr. 11, 2011.
Response to Office Action from U.S. Appl. No. 12/330,554 dated Jul. 11, 2011.
Notice of Allowance from U.S. Appl. No. 12/330,554 dated Sep. 23, 2011.
Office action from U.S. Appl. No. 12/568,728 dated Jun. 10, 2010.
Response from U.S. Appl. No. 12/568,728 dated Nov. 5, 2010.
Office action from U.S. Appl. No. 12/568,728 dated Jan. 24, 2011.
Examiner's First Report for AU Appl. No. 2002341765 dated Apr. 30, 2007.
Response to Examiner's First Report for AU Appl. No. 2002341765 dated Apr. 8, 2008.
Examiner's First Report for AU Appl. No. 2003285024 dated Feb. 24, 2009.
Examiner's First Report for AU Appl. No. 2008214045 dated Jun. 22, 2010.
Response to Examiner's First Report for AU Appl. No. 2008214045 dated Sep. 30, 2010.
Office action from Canadian Application No. 2,399,787 dated May 6, 2005.
Response to Office action from Canadian Application No. 2,399,787 dated Nov. 2, 2005.
Office action from Canadian Application No. 2,463,296 dated Apr. 18, 2007.
Response to Office action from Canadian Application No. 2,463,296 dated Aug. 31, 2007.
Office action from Canadian Application No. 2,463,296 dated Feb. 1, 2008.
Response to Office action from Canadian Application No. 2,463,296 dated Jul. 29, 2008.
Amendments Under Article 34(2)(b) and Comments Regarding Written Opinion Comments in International Patent Application No. PCT/IB2008/050111 dated Oct. 2, 2008.
International Preliminary Report on Patentability for International Patent Application No. PCT/IB2008/050111 dated Apr. 22, 2009.
Office action from Canadian Application No. 2,463,296 dated Feb. 25, 2009.
Response to Office action from Canadian Application No. 2,463,296 dated Aug. 21, 2009.
Office action from Canadian Application No. 2,467,696 dated Apr. 18, 2007.
Response to Office action from Canadian Application No. 2,467,696 dated Oct. 15, 2007.
Office action from Canadian Application No. 2,495,751 dated Dec. 10, 2010.
Office action from Canadian Application No. 2,676,423 dated May 9, 2011.
Office action from Canadian Application No. 2,700,672 dated May 19, 2011.
Communication from European Application No. 95301059.2-2310 dated Oct. 13, 1998.
Response to Communication from European Application No. 95301059.2-2310 dated Apr. 23, 1999.
Communication from European Application No. 01983183.3 dated Jun. 13, 2007.

Communication from European Application No. 02775916.6 dated Jan. 22, 2009.
Response from European Application No. 02775916.6 dated Sep. 17, 2009.
Communication from European Application No. 02775917.4 dated Oct. 6, 2009.
Response from European Application No. 02775917.4 dated Mar. 16, 2010.
Communication from European Application No. 02275917.4 dated May 2, 2011.
Communication forwarding Supplemental EP Search report from Application No. 03779341.1 dated May 4, 2009.
European Search Report from 08010025.8 dated Apr. 29, 2009.
Supplemental Search Report from 08010025.8 dated May 19, 2009.
European Search Report from 10188280.1 dated Feb. 9, 2011.
Communication from European Application No. 10188366.8 dated Dec. 9, 2010.
Response to Communication from European Application No. 10188366.8 dated Jul. 12, 2011.
Communication from European Application No. 10188376.7 dated Dec. 23, 2010.
European Search Report from European Application No. 11156042.1 dated Jun. 7, 2011.
European Search Report from European Application No. 11156051.2 dated Apr. 28, 2011.
European Search Report from European Application No. 11152661.2 dated Mar. 7, 2011.
European Search Report from European Application No. 11161221.4 dated Jul. 22, 2011.
European Search Report from European Application No. 11161227.1 dated Jul. 22, 2011.
Office action from Chinese Patent Appl. No. 200880004382.8 (PCT/US2008/052878) dated Mar. 7, 2011.
Response to Office action from Chinese Patent Appl. No. 200880004382.8 (PCT/US2008/052878) dated Jun. 3, 2011.
Response to Preliminary Examination Report for NZ Appl. No. 510619 dated Jun. 6, 2001.
Examination Report for NZ Appl. No. 510619 dated Nov. 21, 2001.
Response to Nov. 21, 2001 Examination Report for NZ Appl. No. 510619 dated Dec. 20, 2001.
Examination Report for NZ Appl. No. 521169 dated Feb. 28, 2005.
Response to Examination Report for NZ Appl. No. 521169 dated Nov. 2, 2005.
Examination Report for NZ Appl. No. 532326 dated Jun. 9, 2005.
Examination Report for NZ Appl. No. 532715 dated Jun. 1, 2004.
Response to Examination Report for NZ Appl. No. 532715 dated Oct. 12, 2005.
Examination Report for NZ Appl. No. 532715 dated Nov. 15, 2005.
Response to Examination Report for NZ Appl. No. 532715 dated Dec. 7, 2005.
Examination Report for NZ Appl. No. 533122 dated May 9, 2007.
European Search Report from European Application No. 07 10 0483 dated Jun. 18, 2007.
European Search Report from European Application No. 11 15 7165 dated Aug. 4, 2011.

* cited by examiner

WHEELCHAIR WITH SUSPENSION ARMS

This application is the U.S. national phase entry of PCT/IB2008/050111, with an international filing date of Jan. 14, 2008, which claims the benefit of European patent application serial no. 07100483.2, filed Jan. 12, 2007, the entire disclosures of which are fully incorporated herein by reference.

TECHNICAL FIELD

The present invention relates to a motorised wheelchair. The wheels of the wheelchair are suspended at suspension arms in way that driving comfort is increased and tensions in the base of the wheelchair are reduced.

PRIOR ART AND THE PROBLEM UNDERLYING THE INVENTION

Surveys with wheelchair users have revealed that a number of key characteristics of contemporary wheelchairs are still unsatisfactory. For example, driving comfort with state of the art wheelchairs needs to be improved. With respect to the indoor use, it is desirable that a wheelchair is as narrow as possible. On the other hand, for motorised wheelchairs used outdoors, good traction is a relevant characteristic. Furthermore, motorised wheelchairs are generally composed of a number of functional units, which may need to be repaired individually or which are individually up-graded. Therefore, an objective is to provide a low cost base for a wheelchair, which permits easy repair or equipment of individual functional units, such as wheels, batteries, a seat raiser, leg- and footrests, and/or motors, for example.

A particular problem with respect to self-propelled wheeled conveyances in the form of motorized wheelchairs is reported in EP 1513479. Accordingly, when a wheelchair comes to a quick stop, for example because a manually-operated joystick is accidentally let gone, the weight of the wheelchair is thrown forward, which may result in severe conditions. In case that the wheelchair is located on a slope, immediate breaking may have the consequence that the wheelchair user is catapulted from the wheelchair and/or that the wheelchair is overturned completely. The problem is exacerbated by the fact that motorised wheelchairs have a relatively short wheelbase and a relatively high centre of gravity. In some cases, the height of the centre of gravity is even increased by heavy batteries. In view of these problems, it is an objective to improve the stability of a wheelchair, and in particular to lower the centre of gravity in such wheelchairs as much as possible. It is a further objective to provide the seat of the wheeled conveyance as low as possible, in order to keep the centre of gravity low once a user takes seat in the conveyance and to facilitate the access to the conveyance. In EP 1513479, these problems were addressed with a system of suspension arms mounted on a seat carrier. A very big spring, manufactured especially for this kind of wheelchairs, is necessary to absorb the forces transmitted by the long suspension arms. In view of this reference, the objectives of the present invention are to provide a wheeled conveyance without the aid of a special spring, but with more standard, commercially available material, to provide the centre of gravity in a still lower position, and to provide a suspension system for wheels which is less space-demanding.

The problems of stability are not only relevant when there is an immediate stop, but also when a specific obstacle needs to be overcome, for example if a stair or the sidewalk has to be mounted, or in rough, off-road terrain. If a castor wheel of a motorised wheelchair is driven onto an obstacle, the wheelchair chassis is often lifted at the axis of the castor wheel, which results in high tensions in the chassis of the wheelchair. Furthermore, once a wheelchair is partially mounted on an obstacle, increased traction is necessary to propel the skewed wheelchair in its entirety onto the obstacle. It is thus an objective to reduce the tension experienced in the chassis of a wheeled conveyance when mounting an obstacle and to re-distribute forces in a way that the mounting of every day's obstacles, such as sidewalks, can more easily be accomplished.

The present invention seeks solutions for the problems outlined above.

SUMMARY OF INVENTION

The present invention provides a wheeled conveyance with wheels independently suspended on individual suspension arms, which are arranged so that forces are directed in a way that is beneficial to the climbing of obstacles with the conveyance. Thanks to the way the suspension arms are disposed and the way forces are transmitted between them, the driving comfort is improved, especially when mounting obstacles.

Accordingly, the present invention concerns a motorised, wheeled conveyance having a left and a right side, with at least two wheels, a motorised wheel and a castor wheel on each of said left and right sides, wherein each of said wheels is rotatably fixed to a respective suspension arm, with each suspension arm being pivotally fixed to a base at a pivot axis, whereby a force transmitting device directly connects the suspension arm of the castor wheel of one side with the suspension arm of the motorised wheel of the same side of the wheelchair. For example, the force transmitting device may be horizontally arranged and/or be arranged at an angle with respect to horizontal.

The force transmitting device may be selected according to preferences of a user of the wheeled conveyance. It may be a spring, a damper, a combined spring and damper unit, or simply a rigid bar. The choice of the respective device, and in case of springs and dampers, the choice of the respective spring and/or damper force will affect driving characteristics of the wheeled conveyance and adapt it to particular surfaces.

The wheeled conveyance of the present invention solves the problems outlined above. As a particular advantage, the conveyance may easily be converted between indoor and outdoor use, because removal of the suspension and wheels and their replacement by respective equipment better adapted to specific outdoor or indoor use can be effected conveniently and quickly. Furthermore, the entire wheelchair may be upscaled or downscaled as desired by a particular user, by using larger or smaller wheels and suspension arms, as preferred.

Due to the particular arrangement of the force transmitting device, the wheelchair of the present invention achieves an increase of traction friction and amplifies traction force on the tires in various situations, for example when one of the wheels climbs an obstacle on the floor. Without wishing to be bound by theory, it is believed that the force-transmitting device fulfils a primarily dynamic function, which could be illustrated by way Newton's formula $F=m\cdot d^2x/dt^2+c\cdot dx/dt+k\cdot x$, whereby the spring stiffness k and the spring damping c, together with the equivalent mass m of the wheelchair, the wheelchair acceleration/deceleration ($d^2x/dt^2$) and speed ($dx/dt$) determine the dynamic behavious of the wheelchair.

In the wheelchair of the present invention, castor wheels are considered wheels which enable mobility and agility of the wheelchair while maintaining stability. Castor wheels preferably are, during normal operation of the wheelchair, constantly in touch with the ground. Castor wheels, for the purpose of the present invention, are to be differentiated from generally smaller anti-tip wheels, which often are not in touch with the ground and which have the function of preventing tilting of the wheelchair when one or more of the main wheels (motorized and castor wheels) already have lost touch with the ground.

The wheeled conveyance is in general motorised and thus self-propelled. However, the principle of the invention may also apply to non-powered conveyances. Preferably, the motorised, wheeled conveyance comprises a motorised wheelchair. The motorised wheelchair preferably has a seat, supported on the base, with the seat preferably having one or two arm-rests. Preferably the wheelchair has a leg-rest.

The wheeled conveyance preferably comprises batteries for providing electrical energy to the motors. The batteries may be situated on the base of the conveyance.

If the wheeled conveyance of the present invention is a motorised wheelchair, wheels may be motorised with independent motors or with a single motor propelling two or all four wheels. Preferably, one pair of wheels is motorised. It is also preferred that the wheels are motorised independently, for example with each of the motorised wheels having an individual motor.

The number of wheels is not determined for the wheeled conveyance of the present invention. It may have six or four wheels, preferably four. An example of a motorized wheelchair with six wheels is disclosed in U.S. Pat. No. 7,066,290. Similarly to this reference, the wheeled conveyance of the present invention may comprise a pair of motorised wheels and two pairs of smaller, non-motorised wheels having the purpose of stabilising the wheeled conveyance.

Preferably, one or two pairs of non-motorised wheels are present in the wheeled conveyance of the present invention. The non-motorised wheels, also referred to as castor wheels, are preferably free to swivel. Preferably, however, the wheeled conveyance of the present invention has a pair of left and right motorised wheels and a pair of smaller, castor-like non-motorised wheels.

Preferably, the wheeled conveyance of the present invention has four wheels, with a pair of rear wheels, which are motorised wheels, and a pair of front wheels, which are castor wheels. Preferably, the motorised wheels are not swivel-mounted. Thanks to the scaling properties provided by the wheeled conveyance, it is easily possible to provide front motorized wheels and rear castor wheels.

The wheeled conveyance of the present invention comprises a left and a right side. Left and right sides, but also rear and front, top and bottom sides or directions are defined in analogy to a user taking place in the wheeled conveyance. The left side of the user corresponds to the left side of the wheeled conveyance and so forth.

BRIEF DESCRIPTION OF THE DRAWINGS

The device of the present invention is now illustrated by way of example with reference to the appended drawing figures, in which.

DETAILED DESCRIPTION OF THE PREFERRED EMBODIMENTS

Figure 1:
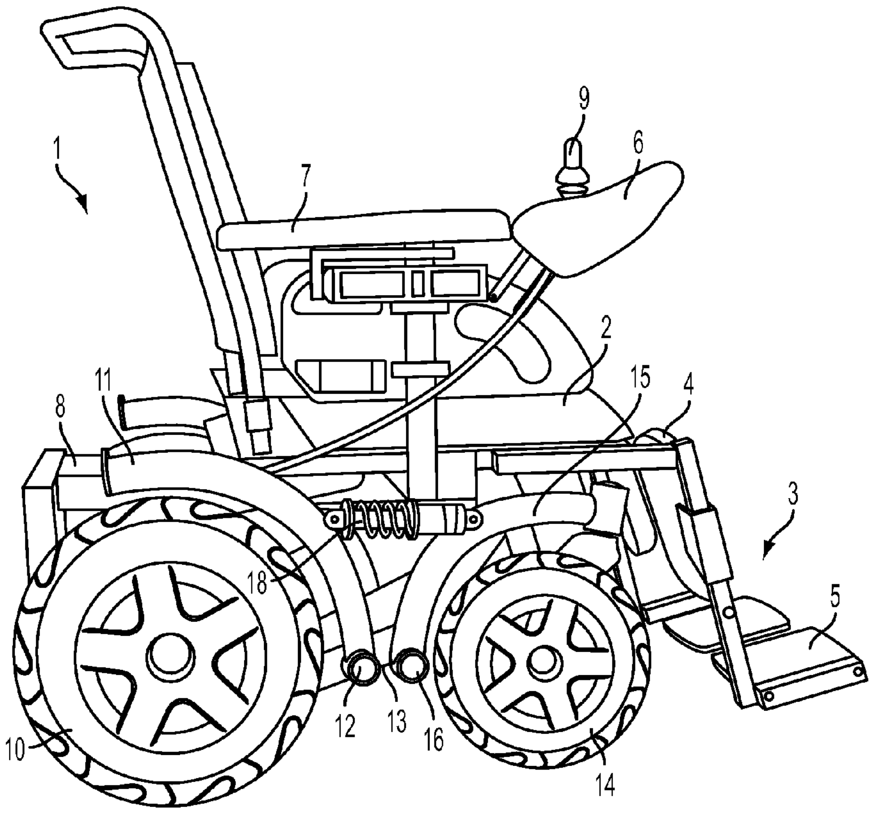
FIG. 1 is a side view to the right side of a wheeled conveyance in the form of a wheelchair according to the present invention.

In FIG. 1, the right-side profile of a complete motorised wheelchair 1 having a pair of left and right motorised rear wheels and a pair of left and right front castor wheels is shown. A seat 2 with a backrest, a right leg-rest 3, and a right castor wheel 14 and a motorised wheel 10, respectively, can be seen. The leg-rest 3 comprises a foot-rest 5 and a calf-rest 4, as usual with wheelchairs. In the wheelchair shown, the leg-rest 3 is mounted to the seat 2. A right armrest 7, also part of the seat 2, is also visible, in front of which a steering and motion control unit 6 comprising a joystick 9 is arranged.

The right suspension arm 15 of the castor wheel 14 is pivotally mounted to the base 13 of the wheelchair at a pivot axis 16, and the right suspension arm 11 of the motorised wheel 10 at a pivot axis 12. The pivot axis 12 and 16 are situated next to each other, horizontally offset. A small portion of the base 13, to which the suspension arms are pivotally fixed at the points 12, 16, is visible between these pivot axis, most of the rest of the base 13 being covered by the wheels 10, 14 and the suspension arms 12, 16, and therefore not visible in this view.

The visible parts of the suspension arms 15 and 11 of the castor and motorised wheels shown in FIG. 1 are curved arms extending partly along a substantially parallel circle of the respective wheel 10, 14 from the respective pivot axis 12, 16 of the suspension arm to the top of the respective wheel. The curved arms correspond to about one quarter of a circle. They are substantially co-planar with the wheel, in as far as there is at least a partial, vertical overlap between the respective wheel and the curved arm of the suspension arms 15, 11.

Figure 2:
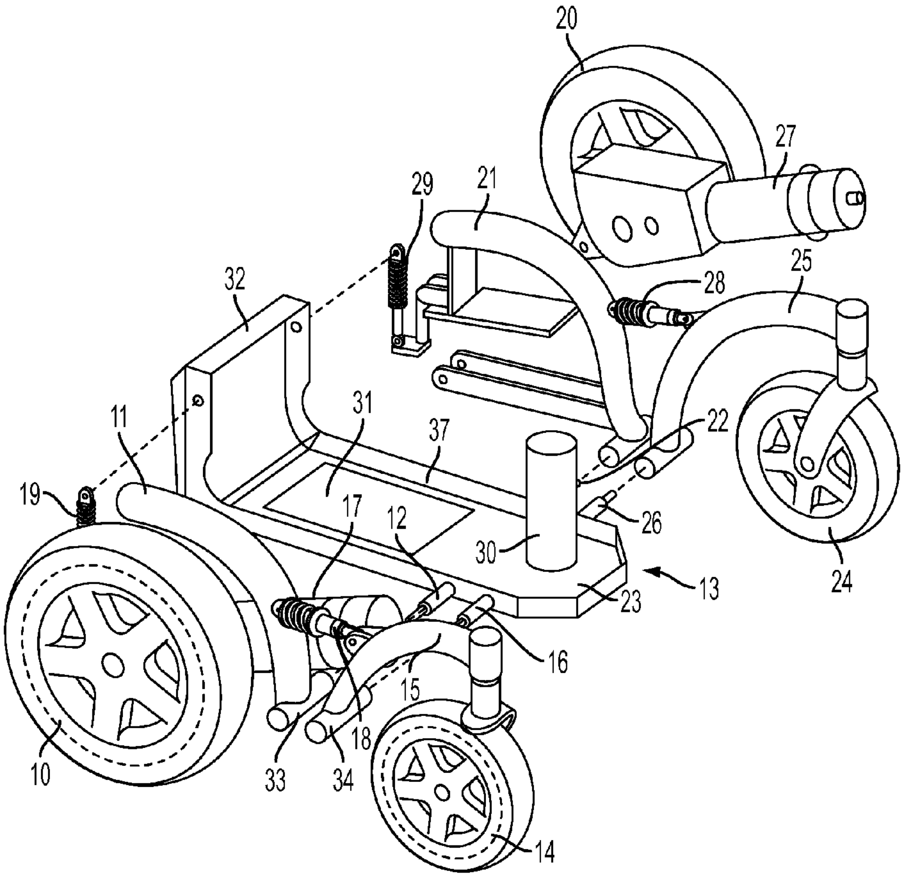
FIG. 2 is an exploded view of the base, the wheels and the support arms of the wheelchair of FIG. 1.
Figure 3:
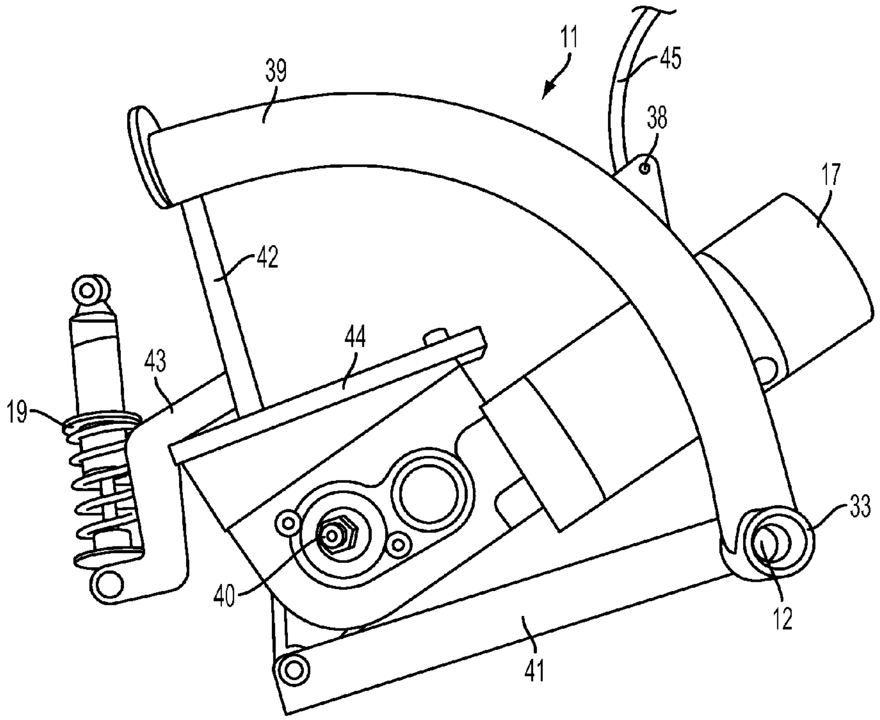
FIG. 3 shows the right back wheel and its suspension arm of the wheelchair of FIG. 1.
Figure 10:
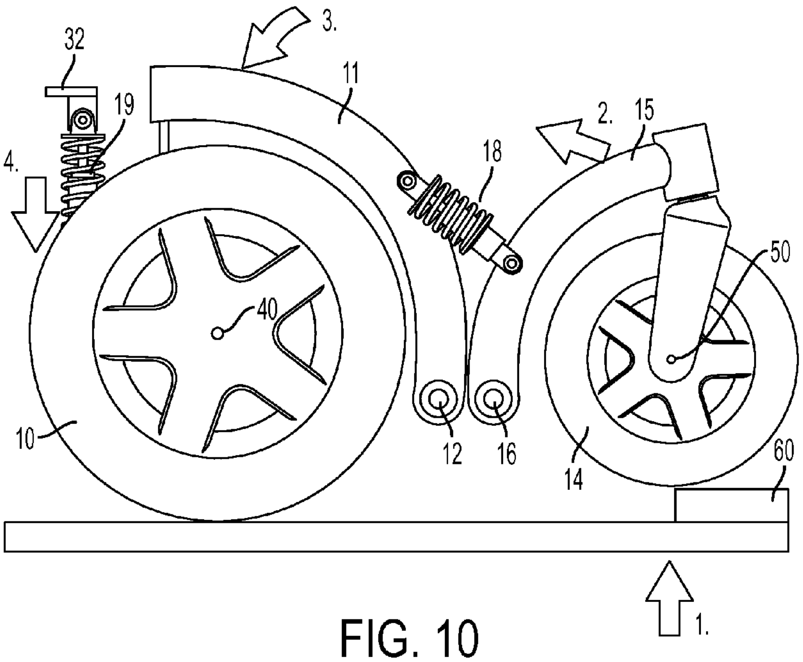
FIG. 10 schematically shows the re-direction of forces from the castor wheel to the motorised wheel when climbing an obstacle with the second embodiment of a wheelchair of the invention.

Other forms may be easily conceived for these suspension arms, especially for the suspension arm 11 of the motorised wheel, which needs further support arms, the latter not being well visible in FIG. 1 (see FIGS. 2 and 3). In the embodiment shown in FIGS. 1-6 suspension arms having a curved part situated in parallel to part of the wheel's circumference, but in a certain distance to it, as is well visible in FIG. 1, are shown. Such suspension arms are advantageous, because the use of space is optimal and little material is used, too, resulting in a compact and light arrangement of the wheelchair. It this arrangement, the suspension arms are at least in part situated in the same plane as the wheels, which helps saving place in the lateral dimensions of the wheelchair. In other words, situating the suspension arms above and/or around the wheels, in the same plane may result in a narrower wheelchair. However, other configurations, especially for the rear suspension arm, can also be conceived within the scope of the present invention, as is shown in the embodiment of FIG. 10 below, for example.

A combined spring and damper unit 18 is also seen in FIG. 1. In an unusual way, the spring and damper unit 18 is not fixed to the chassis or frame of the wheelchair, but the suspension arms 11, 15, for the castor and motorised wheels on one side of the wheelchair are directly connected with each other. The spring, in FIG. 1, and damper unit 18 is in a substantially horizontal position, transmitting and absorbing forces horizontally between the suspension arms of the castor and motorised wheel of either side of the wheelchair. For example, the spring and damper unit 18, 28 (see FIG. 2) is attached so that upon pivoting of the suspension arm of the castor wheel, forces are directly and horizontally transmitted to the suspension arm of the motorised wheel. "Substantially horizontally", for the purpose of the present invention refers to a position which is closer to the horizontal than to the vertical, with respect to the ground.

Preferably, the spring and damper unit is situated close to the horizontal. In other embodiments of the present invention (FIGS. 7-11), the spring and damper unit is not arranged horizontally, but in a specific angle with respect from the ground, which may be from 0° up to about 70°, for example, as will be detailed further below.

The direct connection between suspension arms by a spring and damper unit is advantageous. Firstly, the length of the suspension arms was reduced, leading to a lower lever acting on the spring. A smaller spring, as commercially available, for example as equipment for bicycles could be used. Furthermore, the number of total springs necessary on the wheeled conveyance of the invention could be reduced to only four, which is less than in most prior art devices. Furthermore, forces are directly transmitted from the rear to the front wheel of the same side, and vice versa, which reduces tensions on the base/chassis and increases driving comfort.

In FIG. 1, the force transmitting device is constituted by a device 18 comprising a spring and a telescopic damper, which is particularly preferred. Conveniently, the damper is placed in a central void of the spring. In a composed spring and damper unit 18 the overall arrangement is less complex and more efficient, because forces are absorbed and transmitted at the same position of the conveyance. A bar could also be used instead of springs and dampers at its position. In this case, no damping of the forces would occur, and forces would be transmitted in an undiminished manner.

The position of batteries 8 in the rear part of the wheelchair is also indicated in FIG. 1.

In the exploded view of FIG. 2, the seat and the batteries are absent, to provide further details of the present invention. Accordingly, a base 13, equivalent to a chassis, is horizontally disposed to occupy a central position in the wheeled conveyance of the present invention. The base 13 comprises a base-plate 23, the outline of which is traced with a boarder 37. In the conveyance shown, the boarder 37 surrounds the entire base-plate 23. Of course, the boarder may be absent at least on part of the base. The base 13 comprises, preferably in its rear part, a substantially horizontal loading area for batteries 8. In this rear part, the boarder 37 is useful to prevent the batteries from falling off the wheelchair.

Furthermore, the boarder 37 carries, on its outer surface of the right and left side, axis 12, 16, 22, 26. On each of the right and left side of the wheelchair, two axles are attached, which have the purpose of pivotally attaching the suspension arms of the wheels. Accordingly, two suspension arms 11, 15/21, 25 present on the same, right and/or left side of the conveyance are fixed to the base 13 so that the pivot axis 16, 26 of the suspension arm 15, 25 of the castor wheel 14, 24 is horizontally next to the pivot axis 12, 22 of the suspension arm 11, 21 of the motorised wheel 10, 20 of the same side.

Taking the left side of the wheelchair in FIG. 2 as an example, the suspension arm 25 of the castor wheel 24 is attached at the pivot axis 26 to the base 13. The suspension arm 21 of the left motorised wheel 20 is attached by the pivot axis 22 to the base 13. The axis 22 and 26 correspond to the horizontally offset pivot axis on the left side of the wheelchair, whereas the axis 12 and 16 assume the corresponding function on the right side of the wheelchair. The pivot axis (12, 16/22, 26) of two suspension arms (11, 15/21, 25) present on one side of the conveyance are situated next to each other, both in between the castor and motorised wheel.

It is believed, without wishing to be bound by theory, that the close, horizontally off-set disposition of the axis 12, 16 on the right side, and 22, 26 on the left side, partly account for the increased driving comfort observed with the wheeled conveyance of the present invention. The closeness of the axles of the motorised and castor wheels, respectively, permit the whole conveyance to be shortened in its extension from the rear to the front.

The base 13 comprises a recess 31 in its rear part, because no material is necessary for support at this position. Batteries 8 are sufficiently large to be placed on areas of the base-plate 23 around the recess.

On its rear end, the base 13 comprises a frame 32, which looks like a vertical extension of the boarder 37 of the base. The frame 32 provides a support position that is located higher than the base-plate 23 and to which spring and damper units 19 and 29, for the right and left side of the wheelchair, respectively, are fixed. With their other end, these rear spring and damper devices 19/29, are attached to the right and left support arms 11/21, of the motorised wheels, respectively. More precisely, the rear spring and damper units 19/29, are attached to the rear part of said support arms. Accordingly, a spring and damper unit 19, 29 is fixed with one end to the rear part 32 of the base 13 and with its other end to the rear part of the suspension arm 11/21 of the motorised wheel, whereby the spring and damper unit 19/29 is arranged so as to about vertically transmit and absorb forces.

In contrast to the spring and damper devices connecting the support arms of the castor and motorised wheel of the right and left side, respectively, in FIGS. 1-6, the rear spring and damper devices are preferably in a substantially vertical position. "Substantially vertical", in contrast to "substantially horizontal", refers to a position that may be not strictly vertical but that may be inclined. However, it is preferred that the position of the rear spring and damper unit is closer to the vertical than to the horizontal.

The rear spring and damper units may have the same construction as their counterparts connecting the suspension arms of the castor and motorised wheel. Accordingly, they may be constituted by a spring only or by a damper only. Preferably, however, they are a composed device comprising a spring and a damper.

The position of a seat raiser 30, which can serve as a support for a seat, and which is itself supported by the base plate 23, is also indicated in FIG. 2. For example, a column seat raiser is situated on the base 13 and extends vertically from it. Other types of seat raisers may, of course, also be used for the purpose of the present invention.

FIG. 2 also reveals independent electrical motors 17/27, for propelling the right and left motorised wheels 10/20, respectively.

FIG. 3 provides further details of the suspension arm 11 of the motorised wheel of the right side, detached from the base 13 of the wheelchair, with the wheel 10 being removed. While the wheelchair including the base is not visible in FIG. 3, reference to parts non visible in FIG. 3 but visible in FIG. 2 is made when adequate. Essential elements of the suspension arm of the motorised wheel are the housing 33 for the pivot axis 12 (although the pivot axis 12 is itself not visible in FIG. 3, its theoretical position is indicated with the reference number 12), the rotating axle 40 of the motorised wheel, and the spring and damper unit 19. Also the presence of the motor 17 is essential for the functioning of the wheelchair, unless the castor wheel is the motorised wheel, or if a single motor is arranged to propel several wheels, for example the left and right motorised wheel.

A small housing 38 is indicated on the support arm 11, which serves as point of attachment of the spring and damper unit 18, the other side of said device being attached to the suspension arm 15 of the castor wheel 14 (all of which are not shown in FIG. 3).

A housing 33 for the pivot axis 12, at which the suspension arm of the motorised wheel is pivotally attached to the base 13 (FIG. 2) is indicated.

On the left side of FIG. 3, corresponding to the rear part of the suspension arm 11, the spring and damper unit 19 is seen, fixed with its lower end to the suspension arm, namely to a connecting piece 43, the purpose of which is to provide a support for the spring and damper unit 19. The spring and damper unit 19 is laid down in a vertical position in FIG. 3, in correspondence with its position when attached to the frame 32 of the base 13 of the wheelchair.

The electric motor 17 is fixed at the bottom side of a plate 44 of the suspension arm 11. The axle of rotation of the motorised wheel 40 is thus located in connection with the motor 17, below said plate 44.

A curved arm 39, having the shape of a quarter of a circle, giving the impression of a mud guard cut in two, is the central support element of the support arm 11 of the motorised wheel. At one end of the curved arm 39, at the place of the housing 33 for the pivot axis 12, a first support arm 41 is fixed, and extends substantially vertically but slightly downwards from the housing 33. The first support arm 41 comprises an angle at its left/rear end and extends upwardly from there on, to support the plate 44 on its bottom side. On the rear end of the curved arm 39, on the top left in FIG. 3, a second support arm 42 extends downwardly from and meets the plate 44 to support it on its top side. The connecting piece 43 mentioned above is attached to the second support arm 42 and the top of the plate 44.

It is clear to the skilled person that the construction of the support arm of the motorised wheel may be different from the one shown in FIG. 3, as long as the essential parts are present (see above). It may, for example, be envisaged to provide a single piece, plate-like construction, instead of a number of arms 39, 41, 42, 43. However, the construction of the suspension arm of the motorised wheel 11 as shown is advantageous in some aspects. Accordingly, the motorised wheel 10 (not shown in FIG. 3) may be disposed in substantially the same plane as the curved arm 39. With this disposition, the suspension arm arrangement 11, including the wheel 10 and the motor 17, occupies only a minimum of space in the lateral (left-to-right) dimension of the wheelchair.

Figure 4:
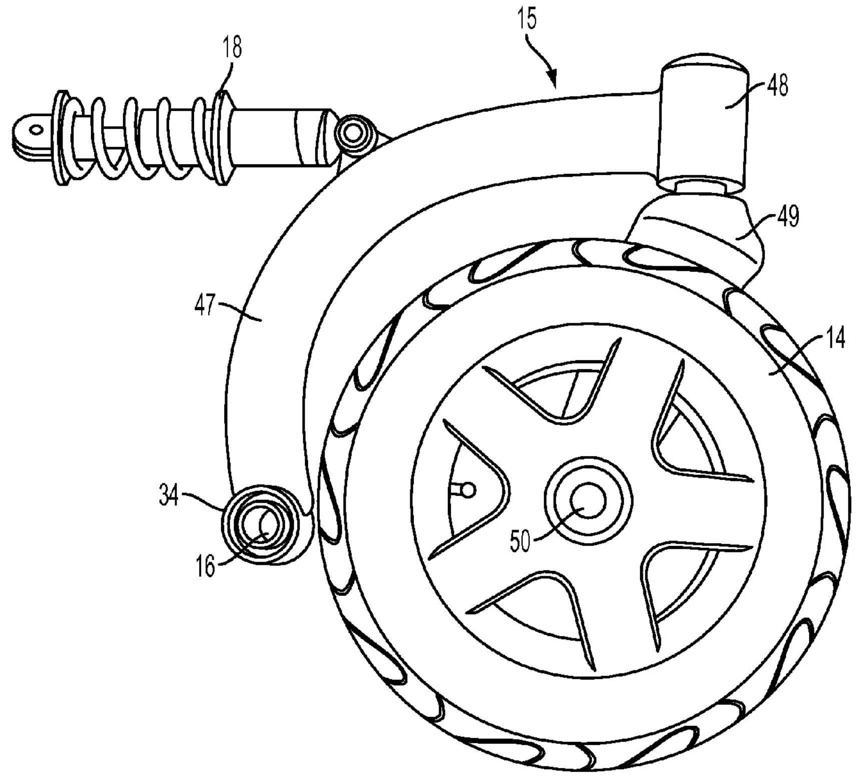
FIG. 4 shows the right castor wheel and its suspension arm of the wheelchair of FIG. 1.

In FIG. 4, the suspension arm 15 of the castor wheel, this time also featuring the castor wheel 14, is shown in greater detail. As with the suspension arm 11 of the motorised wheel, a curved arm 47 provides the central element of the suspension arm, similar to the circumference of a quarter circle, with the housing 34 for the pivot axis 16 (the pivot axis 16 is absent in this view of a detached suspension arm 15, but its theoretical position is indicated) disposed on the left, lower end of said arm 47. The spring and damper unit 18 is shown, fixed to the curved arm 47 and provided substantially horizontally, corresponding to its disposition when connected to the suspension arm 11 of the motorised wheel, at the housing 38 (see FIG. 3).

On its right distal end, the curved arm 47, is connected to a housing 48 for the swivel axle of the castor wheel 14. A support arm 49 can freely swivel in the housing 48 in which it is anchored, and extends laterally downwards along the side of the castor wheel 14 (not visible) to support the axle (50) of the castor wheel 14.

In summary, each motorised wheel 10/20, is mounted on an arc shaped suspensions arm, such that the motorised wheel can move in a vertical plane (x,y) with center axis 12/22. In addition, this conception allows the wheel to be able to rotate, around its motor axis 40, as can be seen in FIG. 3.

On the other hand, the castor wheels 14/24 are mounted so that three movements can be executed. A rotation around axis 50 (FIG. 4), a pivoting around the swivel axle in housing 48 (FIG. 4) and at last a movement in an x,y plane around axis 16/26 (FIG. 2), that is supported by the arced shaped suspension arm 47.

Figure 5:
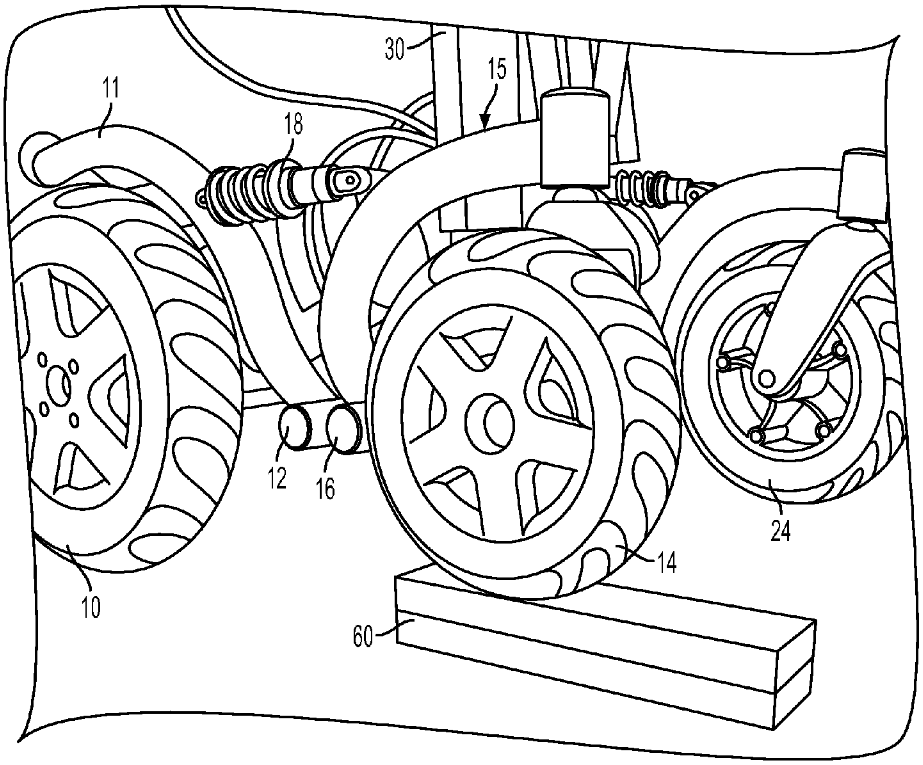
FIG. 5 shows the lower part of the wheelchair with the right front castor wheel climbing on an obstacle.

FIG. 5 shows the lower part of the wheeled conveyance in the form of a wheelchair according to the present invention. The batteries are removed, and the seat is not visible in this view, as the seat raiser 30 is at its maximum extension.

The right castor wheel 14 of the wheeled conveyance in FIG. 5 is lifted on an obstacle 60 of 5 cm height. As can be seen, all other wheels, such as the right motorised wheel 10 and the left castor wheel 24 stay on the ground. In prior art wheelchairs, the situation shown in FIG. 5, with one wheel placed on an obstacle, a high tension may be observed on the chassis due to torsion.

Figure 6:
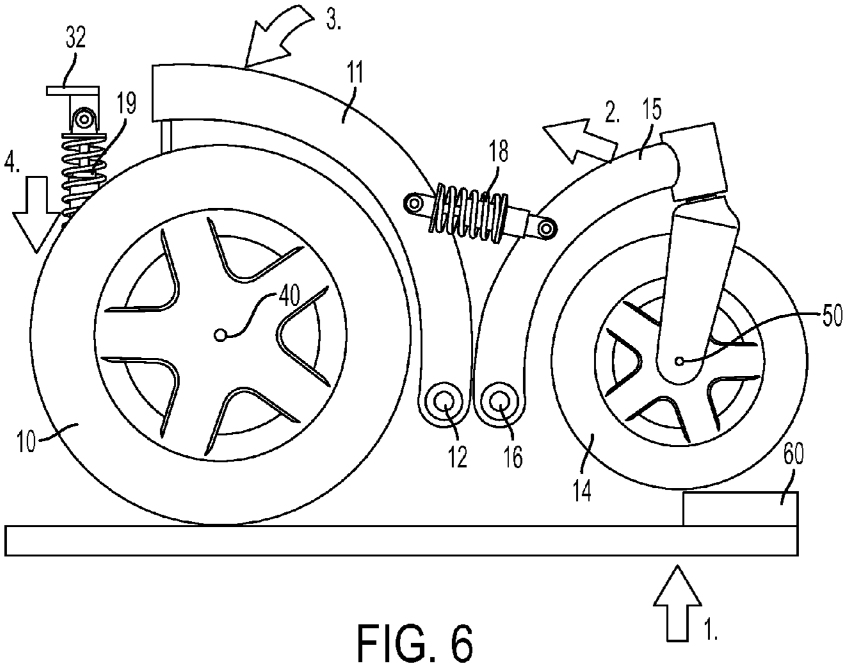
FIG. 6 schematically shows the re-direction of forces from the castor wheel to the motorised wheel when climbing an obstacle with the wheeled conveyance of the present invention.

FIG. 6 is a schematic view of the castor and motorised wheels 14, 10, their respective suspension arms 15, 11, the substantially horizontally disposed spring and damper unit 18 connecting the said suspension arms, and the substantially vertically oriented rear spring and damper unit 19, which connects the suspension arm 11 of the motorised wheel to the frame 32.

The numbers 1.-4. and the arrows indicate the direction of the transmission of forces if the castor wheel 14 mounts an obstacle 60. Accordingly, the castor wheel 14 is lifted upwards following driving against obstacle 60, as indicated by arrow (1.). As a consequence, the suspension arm of the castor wheel 15 pivots around pivot axis 16, resulting of a movement to the back of the latter, indicated by the arrow (2.). The movement of the castor suspension arm 15 is transmitted by the spring and damper unit 18 to the suspension arm 11 of the motorised wheel 10. Therefore, the suspension arm of the motorised wheel 11 pivots around pivot axis 12, with the force being transmitted towards the rear part of the motorised wheel (3.). Finally, the rear spring and damper unit 19 follows the pivoting movement of the suspension arm 11 of the motorised wheel, creating a force directed vertically downwards at the rear part of the motorised wheel. Ideally, the downward force (4.) is exercised behind the axle 40 of the motorised wheel 10. The downward force indicated with arrow (4.) thus further facilitates the up-ward movement of the castor wheel 14 up the obstacle 60. In summary, the suspension arms of the castor and motorised wheels 15, 11/25, 21 present on one side of the conveyance are mechanically connected with each other so that upon upward pivoting of the suspension arm 15/25 of the castor wheel 14/24 a downward force is exerted by the suspension arm 11/21 of the motorised wheel 10/20.

The principle shown in FIG. 6 may explain the increased driving comfort experienced with the wheeled conveyance of the present invention. The fact that the axis of pivoting 12, 16 are disposed next to each other and that suspension arms 15, 11 of the castor and motorised wheels are connected by the spring and damper unit 18, which is oriented horizontally, or, in other embodiments, more tangentially with respect to the rear wheel, also allow for relatively narrow disposition of the castor and motorised wheels 14 and 10. As can be seen in FIGS. 1 and 6, the pivot axis of the suspension arms 12, 16/22, 26 are situated at the same height or lower than the axis 14, 10/24, 21 of the castor and/or motorised wheel, with respect to the ground, in particular as low or lower than the axis of the smaller front wheels, which are the castor wheels in these figures. The base plate is even lower than the pivot axis 12, 16 (FIG. 2). When the batteries 8 are loaded onto the low base plate, it becomes clear that the centre of gravity of the overall conveyance is lower than with prior art devices, for example EP 1513479 B1. The seat 2 can also be situated at a lower level, with its support, the base plate 23 being so close to the ground.

Figure 7:
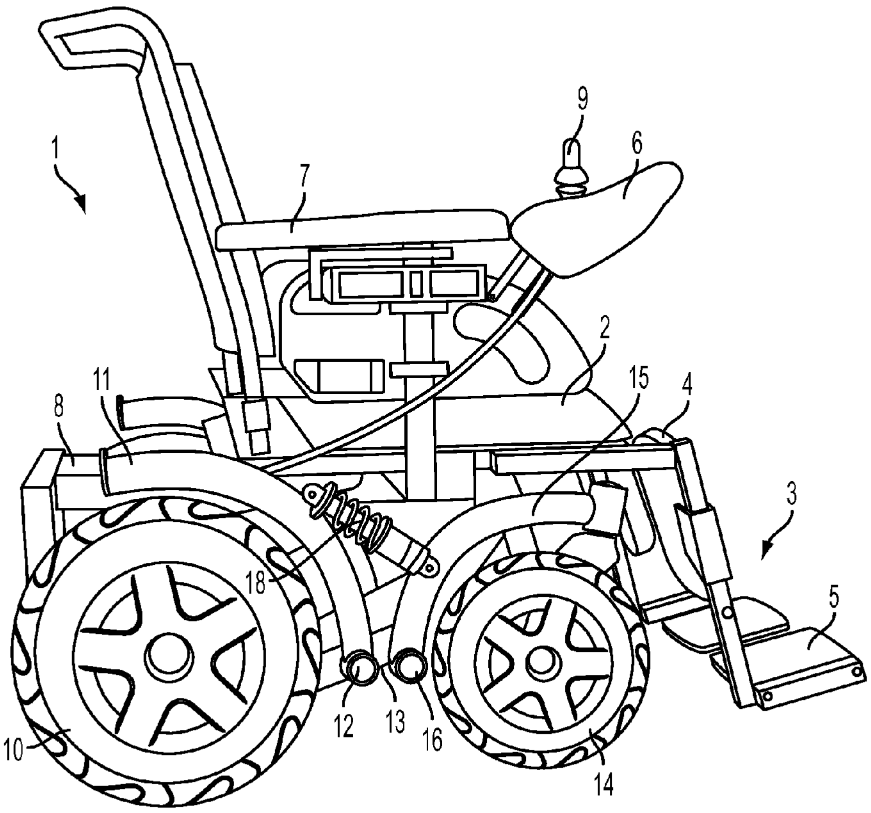
FIG. 7 is a side view to the right side of a second embodiment of a wheelchair according to the present invention.

FIG. 7 shows a wheelchair according to a second embodiment of the present invention. FIG. 7 and the reference numbers used largely correspond to FIG. 1. The only difference in the second embodiment is the orientation of the spring and damper unit 18 connecting the rear and front suspension arms 11 and 15. According to this second embodiment, the spring and damper unit 18, has an angle with respect to horizontal which is around 45°. In this arrangement, the spring and damper unit 18 actually is arranged at an angle which makes its longitudinal axis being oriented in direction which is tangential or parallel to the tangential direction of the rear wheel. It was shown that such an orientation effectively transmits forces from the front to the rear wheel.

Figure 8:
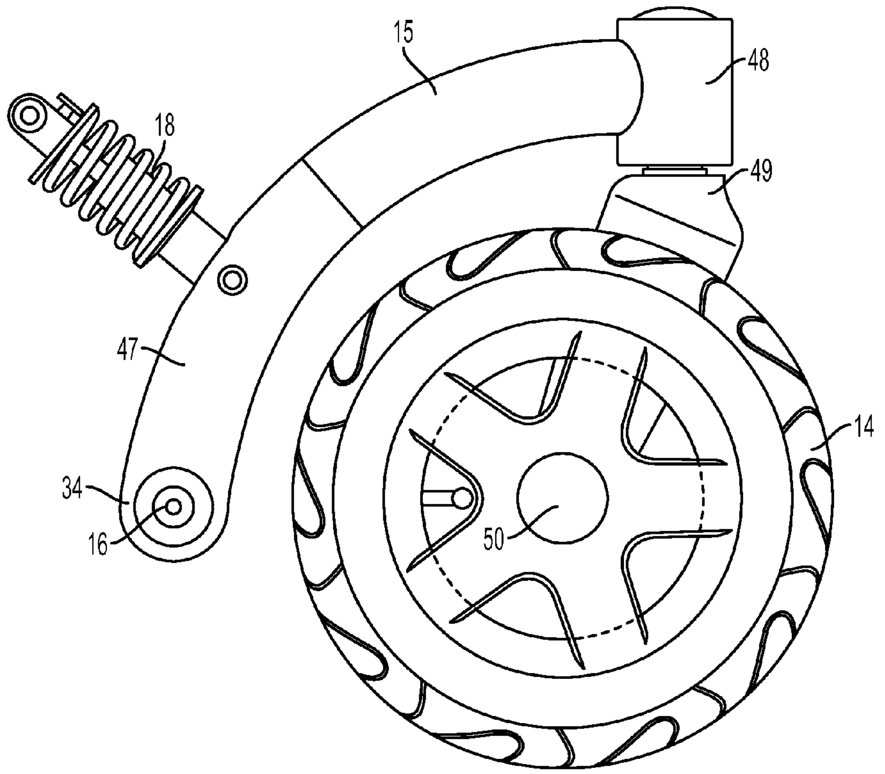
FIG. 8 is shows the right castor wheel and its suspension arm of the second embodiment of the wheelchair of FIG. 7.

FIG. 8 shows the suspension arm of the castor wheel according to the second embodiment (FIG. 7). FIG. 8 largely corresponds to FIG. 4 with the difference that the attachment of the spring and damper unit 18 on the curved arm 47 of the suspension arm 15 is located at a lower position, closer to 34 for the pivot axis 16 (the pivot axis 16 is absent in this view of a detached suspension arm, but its theoretical position is indicated). Due to this lower position, the orientation of the spring and damper unit 18 in the mounted wheelchair will be skew with respect to horizontal, as explained above with respect to FIG. 7. In FIG. 8, the spring and damper unit 18 is shown with in its approximate position when mounted on the wheelchair according to the second embodiment.

Figure 9:
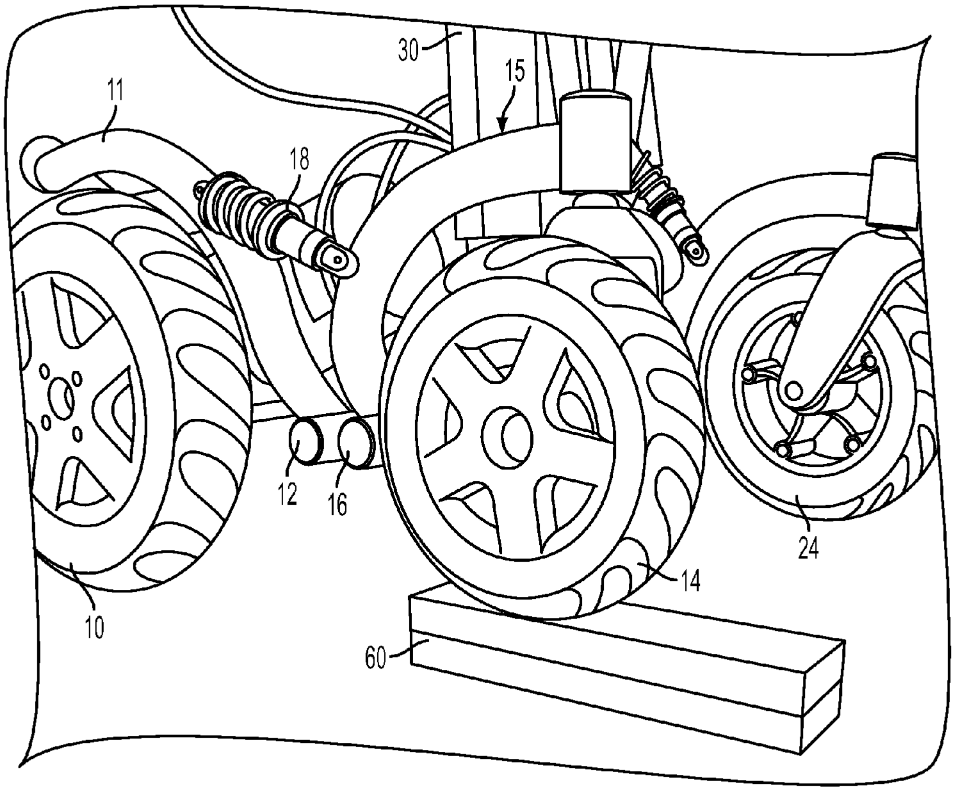
FIG. 9 shows the lower part of the second embodiment of the wheelchair of FIG. 7, with the right front castor wheel climbing on an obstacle.

FIGS. 9 and 10, relating to the second embodiment of the wheelchair of the present invention, correspond to FIGS. 4 and 6, but differ in that the spring and damper unit 18 is oriented as detailed above with respect to FIGS. 7 and 8. Of course, the angle of about 45° of the longitudinal orientation of the spring and damper unit 18, with respect to horizontal, serves as an example. More generally, the angle may be selected from the range of 45°±15°, preferably 45°±10°, more preferably 45°±5°. Under consideration of the first embodiment of the present invention, the angle is selected from the range of 0-55°, more preferably 0-50° and most preferably 0-45°. For the purpose of the present specification, whenever ranges are indicated, end values are considered to be included in the range.

In general, the spring and damper unit 19 is further arranged to be at a right angle with respect to the left to right axis of the wheelchair. For example, the unit 19 is at a right angle with respect to the axle of the wheels. In other words, the spring and damper unit assumes an angle selected from 0 up to 70° with respect to a horizontal rear to front direction of the wheelchair, but does not form any lateral angle, that is, towards the right or the left.

Figure 11:
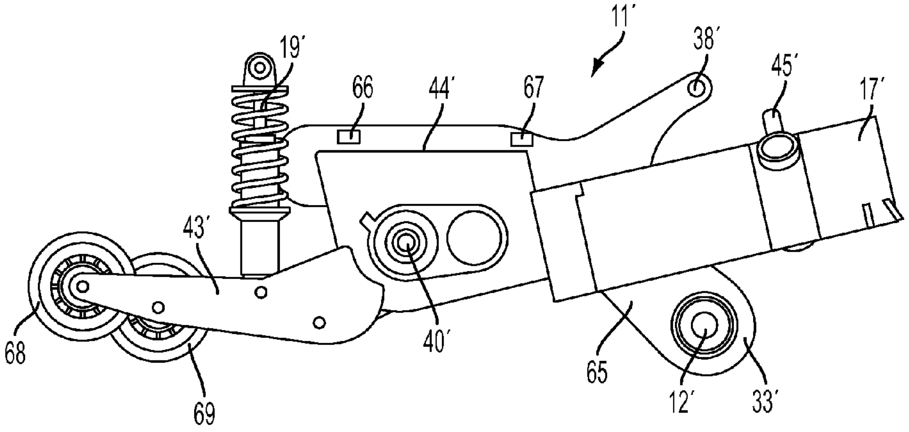
FIG. 11 shows the right rear suspension arm of a motorized wheel of wheelchair according to a third embodiment.

FIG. 11 shows the rear suspension arm according to a third embodiment. In this figure, elements that are analoguous to those described with respect to FIG. 3 are indicated with prime ('). Accordingly, as in FIG. 3, the rear suspension arm 11' shown in FIG. 11 comprises a housing 33' for the pivot axis 12 (not shown, see explanations with respect to FIG. 3), a rotating axle 40' of the motorized wheel, the rear spring and damper unit 19' and a motor 17'.

In the embodiment shown in FIG. 11, the small housing 38', which serves as point of attachment of the spring and damper unit 18 (not shown), is located on a carrying plate 65, which functions as suspension arm. This carrying plate 65 replaces carrying arms 39, 42 and 41 of the embodiment of FIG. 3 and is thus rigidly fixed to the motor 17' by way of screws 66 and 67.

A further difference in FIG. 11 with respect to the first embodiment (FIG. 3) is the form of the connecting piece 43', which, in the present third embodiment, has a longer horizontal dimension and carries, towards its rear distal end, two small carrying wheels 68 and 69. Similar to FIG. 3, the connecting piece 43' of the third embodiment carries a rear spring and damper unit 19', which is arranged in a substantially vertical orientation and which is attached, with its upper end, to the frame 32 of the base 13 of the wheelchair, as has been explained above. The small carrying wheels 68 and 69 are optional but may improve the security of the wheelchair by preventing backward tipping of a wheelchair devoid of any carrying wheels, such as the one shown in FIG. 1.

When mounted on the functional wheelchair, the suspension arm of the motorized wheel according to the third embodiment in FIG. 11 can be connected by the spring and damper unit 18 to the front suspension arm as has been described above. In this embodiment, the orientation of this spring and damper unit 18 may be horizontal or at higher angles, for example 45° as shown in FIGS. 7-10, depending on the point of pivotal attachment of the spring and damper unit 18 to the suspension arm 15 of the castor wheel (see FIG. 4).

The invention claimed is:

1. A wheelchair comprising:

a base having a left and a right side; and at least two wheels on each of said left and right sides of the base, the at least two wheels including a motorized wheel and a castor wheel;

wherein each of said wheels is supported by a respective suspension arm, with each suspension arm being pivotally coupled to the base at a pivot axis;

wherein the pivot axes of the suspension arm of the castor wheel and of the suspension arm of the motorized wheel on the left and right side of the wheelchair, respectively, are situated next to each other, horizontally offset, with both of the pivot axes in between the castor and the motorized wheel;

wherein a force transmitting device directly connects the suspension arm of the castor wheel of one side of the base with the suspension arm of the motorized wheel of the same side of the base so that upon upward pivoting of the suspension arm of the castor wheel a downward force is exerted by the suspension arm of the motorized wheel; and wherein the pivot axes of the suspension arms of the castor wheels are situated at the same height or lower than the axes of rotation of the castor wheels, with respect to the ground, when the motorized wheels and the castor wheels stay on the ground.

2. The wheelchair of claim 1 wherein the suspension arms of the castor wheels are oriented towards a front end of the base and the suspension arms of the motorized wheel are oriented toward a rear end of the base.

3. The wheelchair of claim 1 wherein the pivot axes of the suspension arm of the castor wheel and of the suspension arm of the motorized wheel are disposed on the base at equal height from a horizontal ground on which the wheelchair is placed.

4. The wheelchair of claim 1 wherein an angle between horizontal and a longitudinal axis of the force transmitting device is in the range of from 0° to 70°.

5. The wheelchair of claim 1 in which the force transmitting device is a spring, a damper, a combined spring and damper unit, or a rigid bar.

6. The wheelchair of claim 1 in which the pivot axes of the suspension arms of the motorized wheels are situated at the same height or lower than the axes of rotation of the motorized wheels, with respect to the ground, when the motorized wheels and the castor wheels stay on the ground.

7. The wheelchair of claim 1 in which the force transmitting device is attached so that upon pivoting of the suspension arm of the castor wheel, forces are directly and horizontally transmitted to the suspension arm of the motorized wheel.

8. The wheelchair of claim 1 further comprising a second force transmitting device connected at one end to a rear part of the base and connected at a second end to a rear part of the suspension arm of the motorized wheel, whereby the second force transmitting device is arranged so as to vertically transmit forces between the base and the suspension arm of the motorized wheel.

9. The wheelchair of claim 1 wherein the suspension arms of the castor and the motorized wheels each comprise a curved arm extending partly along a substantially parallel circle of the respective wheel from the respective pivot axis of the suspension arm to the top of the respective wheel.

10. A wheelchair, comprising:

a base having a left side and a right side; and at least two wheels on each of said left and right sides of the base, the at least two wheels including a motorized wheel and a castor wheel;

wherein each of said wheels is supported by a respective suspension arm, with each suspension arm being pivotally coupled to the base at a pivot axis;

wherein the pivot axes of the suspension arm of the castor wheel and of the suspension arm of the motorized wheel on the left and right side of the wheelchair, respectively, are situated next to each other, horizontally offset, with both of the pivot axes in between the castor and the motorized wheel;

wherein a force transmitting device directly connects the suspension arm of the castor wheel of one side of the base with the suspension arm of the motorized wheel of the same side of the base so that upon upward pivoting of the suspension arm of the castor wheel a downward force is exerted by the suspension arm of the motorized wheel; and wherein the base comprises a substantially horizontal loading area for batteries, the loading area being situated at a height with respect to the ground, which is at or lower than the height of axes of rotation of the castor wheel.

11. A wheelchair comprising:

a base having a left and a right side; and at least two wheels on each of said left and right sides of the base, the at least two wheels including a motorized wheel and a castor wheel;

wherein each of said wheels is supported by a respective suspension arm, with each suspension arm being pivotally coupled to the base at a pivot axis;

wherein a force transmitting device directly connects the suspension arm of the castor wheel of one side of the base with the suspension arm of the motorized wheel of the same side of the base so that upon upward pivoting of the suspension arm of the castor wheel a downward force is exerted by the suspension arm of the motorized wheel; and wherein the pivot axes of the suspension arms of the castor wheels are situated at the same height or lower than the axes of rotation of the castor wheels, with respect to the ground, when the motorized wheels and the castor wheels stay on the ground.

12. The wheelchair of claim 11 wherein the suspension arms of the castor wheel are oriented towards a front end of the base and the suspension arms of the motorized wheel are oriented toward a rear end of the base.

13. The wheelchair of claim 11 wherein the pivot axes of the suspension arm of the castor wheel and of the suspension arm of the motorized wheel are disposed on the base at equal height from a horizontal ground on which the wheelchair is placed.

14. The wheelchair of claim 11 wherein an angle between horizontal and a longitudinal axis of the force transmitting device is in the range of from 0° to 70°.

15. The wheelchair of claim 11 in which the force transmitting device is a spring, a damper, a combined spring and damper unit, or a rigid bar.

16. The wheelchair of claim 11 in which the pivot axes of the suspension arms of the motorized wheels are situated at the same height or lower than the axes of rotation of the motorized wheels, with respect to the ground, when the motorized wheels and the castor wheels stay on the ground.

17. The wheelchair of claim 11 in which the force transmitting device is attached so that upon pivoting of the suspension arm of the castor wheel, forces are directly and horizontally transmitted to the suspension arm of the motorized wheel.

18. The wheelchair of claim 11 further comprising a second force transmitting device connected at one end to a rear part of the base and connected at a second end to a rear part of the suspension arm of the motorized wheel, whereby the second force transmitting device is arranged so as to vertically transmit forces between the base and the suspension arm of the motorized wheel.

19. The wheelchair of claim 11 wherein the suspension arms of the castor and the motorized wheels each comprise a curved arm extending partly along a substantially parallel circle of the respective wheel from the respective pivot axis of the suspension arm to the top of the respective wheel.

20. The wheelchair of claim 11 in which the pivot axis of the suspension arm of the castor wheel is horizontally offset with respect of the pivot axis of the suspension arm of the motorized wheel of the same side.

21. The wheelchair of claim 11 in which the pivot axis of the two suspension arms on one side of the wheelchair are situated next to each other, both positioned in between the castor and motorized wheels.

22. A wheelchair, comprising:

a base having a left side and a right side; and at least two wheels on each of said left and right sides of the base, the at least two wheels including a motorized wheel and a castor wheel;

wherein each of said wheels is supported by a respective suspension arm, with each suspension arm being pivotally coupled to the base at a pivot axis;

wherein a force transmitting device directly connects the suspension arm of the castor wheel of one side of the base with the suspension arm of the motorized wheel of the same side of the base so that upon upward pivoting of the suspension arms of the castor wheel a downward force is exerted by the suspension arm of the motorized wheel; and wherein the base comprises a substantially horizontal loading area for batteries, the loading area being situated at a height with respect to the ground, which is at or lower than the height of axes of rotation of the castor wheel.

* * * * *